United States Patent
Matsumura et al.

(10) Patent No.: US 11,696,288 B2
(45) Date of Patent: Jul. 4, 2023

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/753,550

(22) PCT Filed: Oct. 6, 2017

(86) PCT No.: PCT/JP2017/036542
§ 371 (c)(1),
(2) Date: Apr. 3, 2020

(87) PCT Pub. No.: WO2019/069464
PCT Pub. Date: Apr. 11, 2019

(65) Prior Publication Data
US 2020/0296713 A1 Sep. 17, 2020

(51) Int. Cl.
*H04W 72/21* (2023.01)
(52) U.S. Cl.
CPC .................. *H04W 72/21* (2023.01)
(58) Field of Classification Search
CPC ......... H04W 72/0413; H04W 72/1278; H04W 72/04; H04W 72/12; H04L 1/1671; H04L 1/1861; H04L 5/0012; H04L 5/0048; H04L 5/001; H04L 5/0026; H04L 5/0094; H04L 5/0053
See application file for complete search history.

(56) References Cited

U.S. PATENT DOCUMENTS

| | | | |
|---|---|---|---|
| 10,841,904 B2* | 11/2020 | Yin | H04W 72/23 |
| 11,265,855 B2* | 3/2022 | Xiong | H04L 5/00 |
| 2014/0153532 A1 | 6/2014 | Nogami et al. | |
| 2014/0169316 A1* | 6/2014 | Kim | H04L 5/0048 370/329 |

(Continued)

FOREIGN PATENT DOCUMENTS

JP 2013-026876 A 2/2013

OTHER PUBLICATIONS

CATT, Further discussion on PUCCH resource allocation, R1-1712406, 3GPP TSG RAN WG1 Meeting #90, Prague, Czechia, Aug. 21-25, 2017 (Year: 2017).*
Huawei, HiSilicon, PUCCH resource allocation for HARQ-ACK and SR, R1-1713743, 3GPP TSG RAN WG1 Meeting #90, Prague, Czech Republic, Aug. 21-25, 2017 (Year: 2017).*

(Continued)

*Primary Examiner* — Ayaz R Sheikh
*Assistant Examiner* — Tarell A Hampton
(74) *Attorney, Agent, or Firm* — Osha Bergman Watanabe & Burton LLP

(57) ABSTRACT

A terminal is disclosed including a processor that controls a transmission of an uplink control information (UCI) based on configuration information for an uplink control channel (PUCCH) resource; and a transmitter that transmits the UCI using the PUCCH resource, wherein the configuration information comprises at least one of information regarding a PUCCH format, information regarding a frequency domain, information regarding a time domain, and information regarding a code. In another aspect, a radio communication method is also disclosed.

4 Claims, 15 Drawing Sheets

| DCI FIELD | PUCCH RESOURCE #0 | PUCCH RESOURCE #1 | PUCCH RESOURCE #2 | PUCCH RESOURCE #3 | NUMBER OF PUCCH RESOURCES TO BE ACTIVATED |
|---|---|---|---|---|---|
| | FORMAT, PRB, SYMBOL, CODE INFORMATION | FORMAT, PRB, SYMBOL, CODE INFORMATION | FORMAT, PRB, SYMBOL, CODE INFORMATION | FORMAT, PRB, SYMBOL, CODE INFORMATION | |
| 00 | PARAMETER SET A0 | PARAMETER SET B0 | PARAMETER SET C0 | PARAMETER SET D0 | n1 |
| 01 | PARAMETER SET A1 | PARAMETER SET B1 | PARAMETER SET C1 | PARAMETER SET D1 | n2 |
| 10 | PARAMETER SET A2 | PARAMETER SET B2 | PARAMETER SET C2 | PARAMETER SET D2 | n3 |
| 11 | PARAMETER SET A3 | PARAMETER SET B3 | PARAMETER SET C3 | PARAMETER SET D3 | n4 |

(56) References Cited

U.S. PATENT DOCUMENTS

| | | | | |
|---|---|---|---|---|
| 2014/0241188 | A1* | 8/2014 | Park | H04L 27/2613 |
| | | | | 370/252 |
| 2016/0191221 | A1* | 6/2016 | Fukuta | H04W 72/0413 |
| | | | | 370/329 |
| 2016/0226639 | A1* | 8/2016 | Xiong | H04L 5/0053 |
| 2018/0132229 | A1* | 5/2018 | Li | H04L 5/0053 |
| 2018/0192416 | A1* | 7/2018 | Yin | H04L 1/1607 |
| 2018/0192417 | A1* | 7/2018 | Yin | H04L 5/005 |
| 2018/0295651 | A1* | 10/2018 | Cao | H04W 74/0833 |
| 2018/0323932 | A1* | 11/2018 | Huang | H04B 1/713 |
| 2018/0324787 | A1* | 11/2018 | Yin | H04L 1/1861 |
| 2018/0367185 | A1* | 12/2018 | Yi | H04L 5/0012 |
| 2019/0036665 | A1* | 1/2019 | Park | H04L 5/0051 |
| 2019/0045498 | A1* | 2/2019 | Huang | H04W 72/085 |
| 2019/0052421 | A1* | 2/2019 | Yin | H04B 1/713 |
| 2019/0052422 | A1* | 2/2019 | Yin | H04L 5/005 |
| 2019/0068317 | A1* | 2/2019 | Babaei | H04L 1/1664 |
| 2019/0104516 | A1* | 4/2019 | Oh | H04L 5/0053 |
| 2019/0109732 | A1* | 4/2019 | Choi | H04L 1/00 |
| 2019/0159191 | A1* | 5/2019 | Kim | H04W 76/27 |
| 2019/0190669 | A1* | 6/2019 | Park | H04B 7/0695 |
| 2019/0222254 | A1* | 7/2019 | Kim | H04L 5/00 |
| 2019/0223205 | A1* | 7/2019 | Papasakellariou | H04L 5/0044 |
| 2019/0268901 | A1* | 8/2019 | Park | H04W 72/10 |
| 2019/0280734 | A1* | 9/2019 | Park | H04L 5/0012 |
| 2020/0029325 | A1* | 1/2020 | Hwang | H04L 5/0055 |
| 2020/0036489 | A1* | 1/2020 | Wang | H04L 5/0035 |
| 2020/0077424 | A1* | 3/2020 | Baldemair | H04L 27/2602 |
| 2020/0092055 | A1* | 3/2020 | Choi | H04L 5/0091 |
| 2020/0221394 | A1* | 7/2020 | Yoshimura | H04W 52/325 |
| 2020/0228289 | A1* | 7/2020 | He | H04L 5/0064 |
| 2020/0229177 | A1* | 7/2020 | Zou | H04W 72/0413 |
| 2020/0235881 | A1* | 7/2020 | Choi | H04W 72/04 |
| 2020/0236670 | A1* | 7/2020 | Xiong | H04J 13/0074 |
| 2020/0260526 | A1* | 8/2020 | Xiong | H04W 80/08 |
| 2020/0351043 | A1* | 11/2020 | Xiong | H04L 5/0069 |
| 2021/0068148 | A1* | 3/2021 | Yamamoto | H04W 74/006 |
| 2021/0143948 | A1* | 5/2021 | Choi | H04L 5/0012 |
| 2021/0274528 | A1* | 9/2021 | Papasakellariou | |
| | | | | H04W 72/1268 |

OTHER PUBLICATIONS

ZTE, NR PUCCH resource allocation, R1-1712454, NR PUCCH resource allocation, 3GPP TSG RAN WG1 Meeting #90, Prague, Czechia, Aug. 21-25, 2017 (Year: 2017).*
ZTE,LG Electronics, Ericsson, Intel, WF on sPUCCH resource allocation for HARQ-ACK transmission, R1-1714882, 3GPP TSG RAN1 #90 Prague, Czech Republic, Aug. 21-25, 2017 (Year: 2017).*
LG Electronics, Intel, WF on PUCCH time-domain resource indication methods, R1-1715168, 3GPP TSG RAN Meeting #90 Prague, Czech Republic, 21th-35th Aug. 2017 (Year: 2017).*
Extended European Search Report in counterpart European Application No. 17928097.9 dated Apr. 14, 2021 (10 pages).
NTT Docomo, Inc.; "Resource allocation for PUCCH"; 3GPP TSG RAN WG1 Meeting 90bis, R1-1718214; Prague, CZ; Oct. 9-13, 2017 (11 pages).
Samsung; "Resource Allocation for PUCCH transmission"; 3GPP TSG RAN WG1 Meeting 90bis, R1-1717655; Prague, CZ; Oct. 9-13, 2017 (4 pages).
Nokia et al; "PUCCH Resource Allocation"; 3GPP TSG-RAN WG1 #90bis, R1-1718311; Prague, Czech Republic; Oct. 9-13, 2017 (8 pages).
International Search Report issued in PCT/JP2017/036542 dated Dec. 26, 2017 (2 pages).
Written Opinion of the International Searching Authority issued in PCT/JP2017/036542 dated Dec. 26, 2017 (4 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Notice of Reasons for Refusal issued in Japanese Application No. 2019-546513 dated Dec. 21, 2021 (6 pages).
CATT, "On PUCCH resource allocation", 3GPP TSG RAN WG1 Meeting #90bis, R1-1717832, Prague, Czechia, Oct. 9-13, 2017 (4 pages).
Office Action issued in Indian Application No. 202037018025 dated Mar. 10, 2022 (6 pages).
Office Action issued in counterpart European Patent Application No. 17 928 097.9 dated Dec. 16, 2022 (6 pages).

* cited by examiner

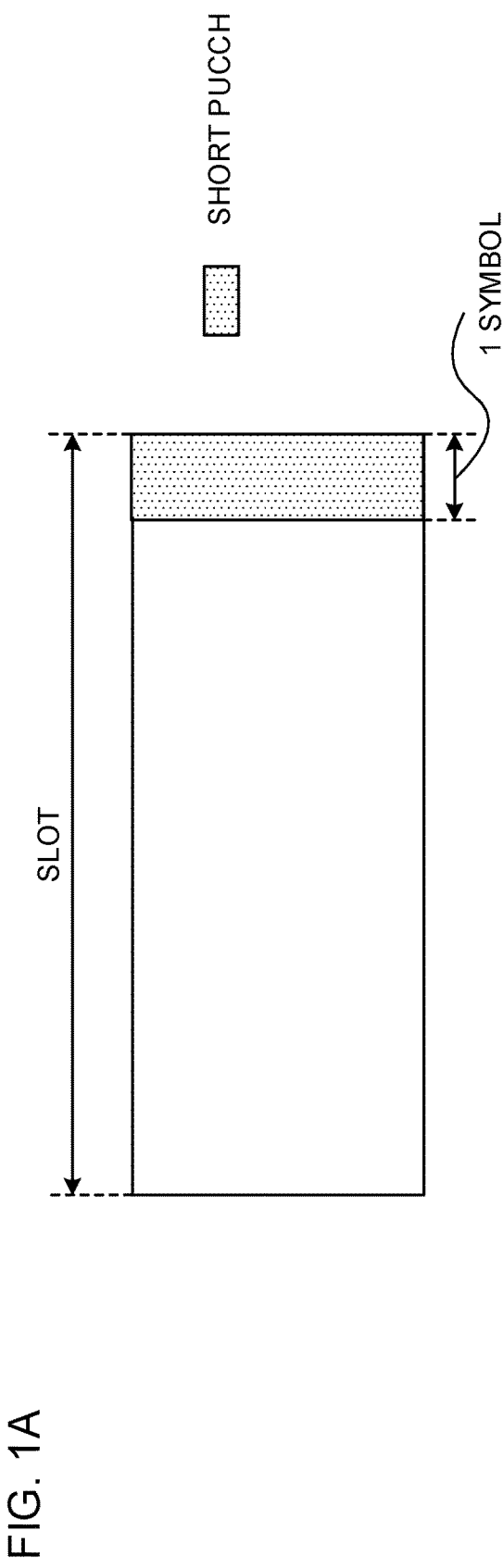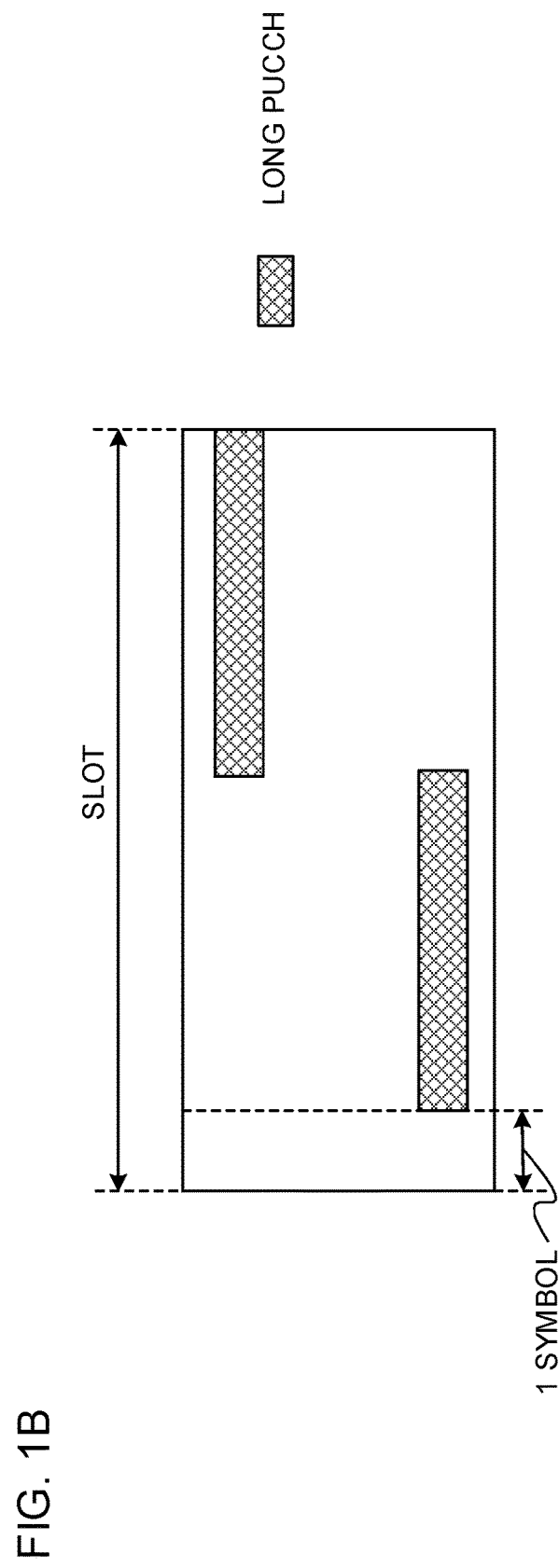

| PUCCH FORMAT | NUMBER OF SYMBOLS | NUMBER OF BITS |
|---|---|---|
| 0 | 1-2 | ≤2 |
| 1 | 4-14 | ≤1 |
| 2 | 1-2 | >2 |
| 3 | 4-14 | >2, <N |
| 4 | 4-14 | >2 |

FIG. 2

| DCI FIELD | PUCCH RESOURCE #0 | PUCCH RESOURCE #1 | PUCCH RESOURCE #2 | PUCCH RESOURCE #3 |
|---|---|---|---|---|
| | FORMAT, PRB, SYMBOL, CODE INFORMATION | FORMAT, PRB, SYMBOL, CODE INFORMATION | FORMAT, PRB, SYMBOL, CODE INFORMATION | FORMAT, PRB, SYMBOL, CODE INFORMATION |
| 00 | PARAMETER SET A0 | PARAMETER SET B0 | PARAMETER SET C0 | PARAMETER SET D0 |
| 01 | PARAMETER SET A1 | PARAMETER SET B1 | PARAMETER SET C1 | PARAMETER SET D1 |
| 10 | PARAMETER SET A2 | PARAMETER SET B2 | PARAMETER SET C2 | PARAMETER SET D2 |
| 11 | PARAMETER SET A3 | PARAMETER SET B3 | PARAMETER SET C3 | PARAMETER SET D3 |

FIG. 6

| DCI FIELD | PUCCH RESOURCE #0 | | PUCCH RESOURCE #1 | | PUCCH RESOURCE #2 | | PUCCH RESOURCE #3 | | NUMBER OF PUCCH RESOURCES TO BE ACTIVATED |
|---|---|---|---|---|---|---|---|---|---|
| | FORMAT, PRB, SYMBOL, CODE INFORMATION | | FORMAT, PRB, SYMBOL, CODE INFORMATION | | FORMAT, PRB, SYMBOL, CODE INFORMATION | | FORMAT, PRB, SYMBOL, CODE INFORMATION | | |
| 00 | PARAMETER SET A0 | | PARAMETER SET B0 | | PARAMETER SET C0 | | PARAMETER SET D0 | | n1 |
| 01 | PARAMETER SET A1 | | PARAMETER SET B1 | | PARAMETER SET C1 | | PARAMETER SET D1 | | n2 |
| 10 | PARAMETER SET A2 | | PARAMETER SET B2 | | PARAMETER SET C2 | | PARAMETER SET D2 | | n3 |
| 11 | PARAMETER SET A3 | | PARAMETER SET B3 | | PARAMETER SET C3 | | PARAMETER SET D3 | | n4 |

FIG. 7

| DCI FIELD | PUCCH RESOURCE #0 | | PUCCH RESOURCE #1 | |
|---|---|---|---|---|
| | FORMAT, PRB, SYMBOL, CODE INFORMATION | | FORMAT, PRB, SYMBOL, CODE INFORMATION | |
| 00 | PARAMETER SET A0 | | PARAMETER SET B0 | |
| 01 | PARAMETER SET A1 | | PARAMETER SET B1 | |
| 10 | PARAMETER SET A2 | | PARAMETER SET B2 | |
| 11 | PARAMETER SET A3 | | PARAMETER SET B3 | |

FIG. 8

| DCI FIELD | PUCCH RESOURCE #0 FORMAT, PRB, SYMBOL, CODE INFORMATION | PUCCH RESOURCE #1 FORMAT, PRB, SYMBOL, CODE INFORMATION | NUMBER OF PUCCH RESOURCES TO BE ACTIVATED |
|---|---|---|---|
| 00 | PARAMETER SET A0 | PARAMETER SET B0 | n1 |
| 01 | PARAMETER SET A1 | PARAMETER SET B1 | n1 |
| 10 | PARAMETER SET A2 | PARAMETER SET B2 | n2 |
| 11 | PARAMETER SET A3 | PARAMETER SET B3 | n2 |

FIG. 9

USER TERMINAL AND RADIO COMMUNICATION METHOD

TECHNICAL FIELD

The present invention relates to a user terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for the purpose of wider bands and a higher speed than those of LTE, LTE successor systems (also referred to as, for example, LTE-Advanced (LTE-A), Future Radio Access (FRA), 4G, 5G, 5G+ (plus), New RAT (NR) or LTE Rel. 13, 14 or 15~) have been also studied.

Legacy LTE systems (e.g., LTE Rel. 8 to 13) perform communication on Downlink (DL) and/or Uplink (UL) by using a subframe (also referred to as Transmission Time Intervals (TTI)) of 1 ms. The subframe is a transmission time unit of one channel-coded data packet, and is a processing unit of scheduling, link adaptation and retransmission control (HARQ: Hybrid Automatic Repeat reQuest).

Furthermore, according to the legacy LTE systems (e.g., LTE Rel. 8 to 13), a user terminal transmits Uplink Control Information (UCI) by using a UL control channel (e.g., PUCCH: Physical Uplink Control Channel) or a UL data channel (e.g., PUCCH: Physical Uplink Shared Channel). The UL control channel configuration (format) will be referred to as a PUCCH format.

The UCI includes at least one of a Scheduling Request (SR), retransmission control information (HARQ-ACK: Hybrid Automatic Repeat reQuest-Acknowledge, ACK or Negative ACK (NACK)) for DL data (DL data channel (e.g., PDSCH: Physical Downlink Shared Channel), and Channel State Information (CSI).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

The future radio communication systems (e.g., LTE Rel. 14 and 15~, 5G and NG) are assumed to transmit UCI by using a UL control channel of a different configuration (format) from those of the legacy LTE systems (e.g., LTE Rel. 13 and prior releases).

For example, a PUCCH format used by the legacy LTE systems is configured in a subframe unit of 1 ms. On the other hand, it is studied for future radio communication systems to support a UL control channel (also referred to as a short PUCCH below) of a shorter duration than those of the legacy LTE systems. Furthermore, it has been also studied to support a UL control channel (also referred to as a long PUCCH below) of a longer duration than that of the short PUCCH.

Furthermore, it is also assumed to control transmission of UCI by using one or more uplink control channel resources on a plurality of UL control channels (e.g., a short PUCCH and/or a long PUCCH). In this case, a problem is how to configure or notify a plurality of uplink control channel resources.

The present invention has been made in light of this point, and one of objects of the present invention is to provide a user terminal and a radio communication method that can appropriately control transmission of UCI that uses one or more uplink control channel resources.

Solution to Problem

One aspect of a user terminal according to the present invention includes: a transmission section that transmits Uplink Control Information (UCI) by using one or more uplink control channel resources; and a control section that controls the transmission of the UCI based on predetermined downlink control information including information related to a plurality of uplink control channel resources.

Advantageous Effects of Invention

According to the present invention, it is possible to appropriately control transmission of UCI that uses one or more uplink control channel resources.

BRIEF DESCRIPTION OF DRAWINGS

FIGS. 1A and 1B are diagrams illustrating one example of a short PUCCH and a long PUCCH.

FIG. 2 is a diagram illustrating one example of PUCCH formats of future radio communication systems.

FIG. 6 is a diagram illustrating one example of a table that defines combination candidates of a plurality of PUCCH resources.

FIG. 7 is a diagram illustrating one example of a table that defines combination candidates of a plurality of PUCCH resources.

FIG. 8 is a diagram illustrating one example of a table that defines combination candidates of a plurality of PUCCH resources.

FIG. 9 is a diagram illustrating one example of a table that defines combination candidates of a plurality of PUCCH resources.

DESCRIPTION OF EMBODIMENTS

Figure 3:
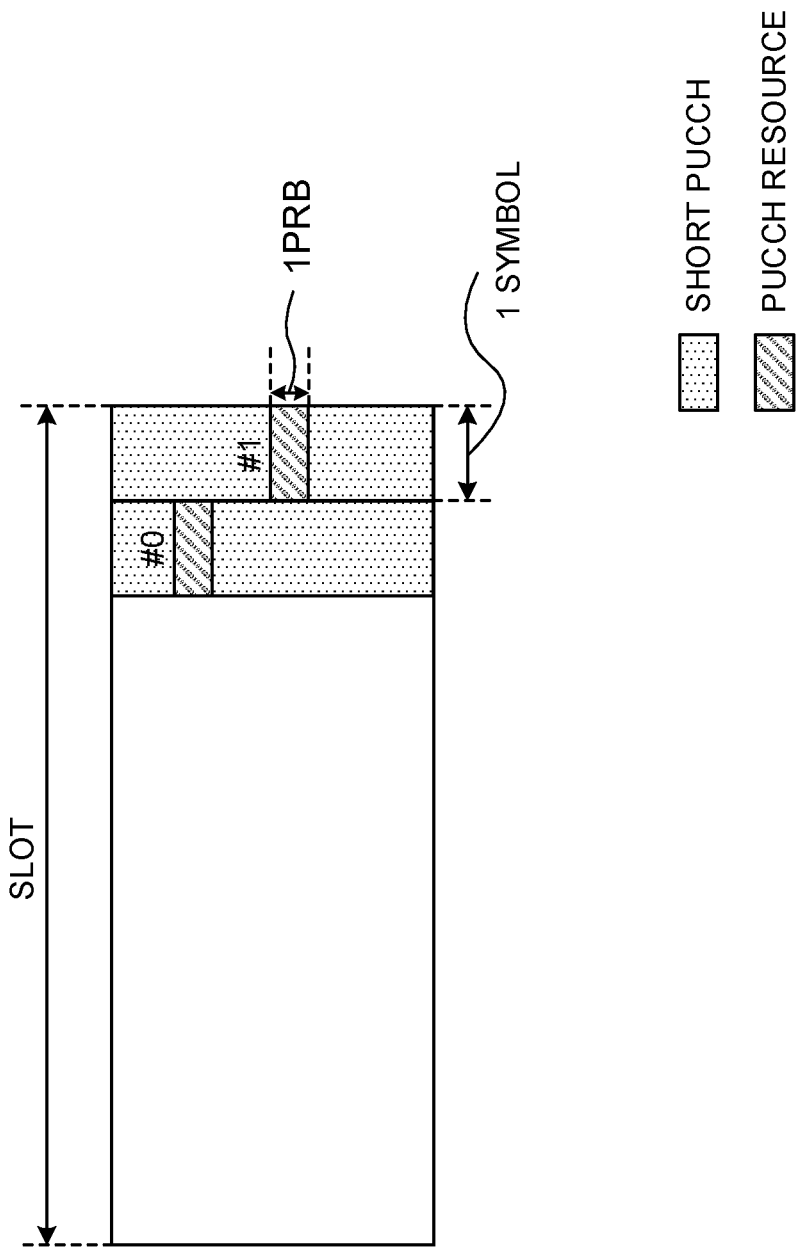
FIG. 3 is a diagram illustrating one example of allocation of PUCCH resources of the short PUCCHs.

For future radio communication systems (e.g., LTE Rel. 15~, 5G and NR), a UL control channel (e.g., PUCCH) configuration (also referred to as a format or a PUCCH format) used for transmission of UCI has been studied.

FIG. 1 is a diagram illustrating one example of a PUCCH according to the future radio communication systems. FIG. 1A illustrates a PUCCH (short PUCCH) including a relatively small number of symbols (a duration such as 1 to 2 symbols). FIG. 1B illustrates a PUCCH (long PUCCH) including a larger number of symbols (a duration such as 4 to 14 symbols) than that of the short PUCCH.

As illustrated in FIG. 1A, the short PUCCH may be arranged on a predetermined number of symbols (e.g., 1 to 2 symbols) from the last of a slot. In addition, the arranged symbols of the short PUCCH are not limited to the last of the slot, and may be a predetermined number of symbols at the head or the middle of the slot. Furthermore, the short PUCCH is arranged on one or more frequency resources (e.g., one or more Physical Resource Blocks (PRBs)). In addition, the short PUCCH is arranged on the contiguous PRBs in FIG. 1A, yet may be arranged on non-contiguous PRBs.

Furthermore, the short PUCCH may be subjected to time division multiplexing and/or frequency division multiplexing with a UL data channel (also referred to as a PUSCH below) in the slot. Furthermore, the short PUCCH may be subjected to time division multiplexing and/or frequency division multiplexing with a DL data channel (also referred to as a PDSCH below) and/or a DL control channel (also referred to as a PDCCH: Physical Downlink Control Channel below) in a slot.

On the short PUCCH, a multicarrier waveform (e.g., an Orthogonal Frequency Division Multiplexing (OFDM) waveform) may be used, or a single carrier waveform (Discrete Fourier Transform-Spread-Orthogonal Frequency Division Multiplexing (DFT-s-OFDM) waveform) may be used.

On the other hand, as illustrated in FIG. 1B, the long PUCCH is arranged over a larger number of symbols (e.g., 4 to 14 symbols) than that of the short PUCCH. In FIG. 1B, the long PUCCH is not arranged on a predetermined number of head symbols of the slot, yet may be arranged on the predetermined number of head symbols.

As illustrated in FIG. 1B, to obtain a power boosting effect, the long PUCCH may include a smaller number of frequency resources (e.g., one or two PRBs) than that of the short PUCCH or may include an equal number of frequency resources to that of the short PUCCH.

Furthermore, the long PUCCH may be subjected to frequency division multiplexing with the PUSCH in the slot. Furthermore, the long PUCCH may be subjected to time division multiplexing with the PDCCH in the slot. Furthermore, the long PUCCH may be arranged in a slot identical to that of the short PUCCH. On the long PUCCH, a single carrier waveform (e.g., DFT-s-OFDM waveform) may be used, and a multicarrier waveform (e.g., OFDM waveform) may be used.

Furthermore, as illustrated in FIG. 1B, the long PUCCH may be applied frequency hopping per predetermined duration (e.g., mini (sub) slot) in the slot. The frequency hopping may be performed at such a timing (e.g., 7 symbols in a case of 14 symbols per slot) that the number of symbols to be transmitted before and after the frequency hopping becomes equal, or may be performed at such a timing (e.g., the first half is 6 symbols and the second half is 8 symbols in a case of the 14 symbols per slot) that the numbers of symbols of the first half and the second half become unequal.

FIG. 2 is a diagram illustrating one example of a PUCCH format of the future radio communication systems. FIG. 2 illustrates the number of symbols that compose the PUCCH, and/a plurality of PUCCH formats of different numbers of bits of UCI that is transmitted by using a PUCCH. In addition, the PUCCH format illustrated in FIG. 2 is only exemplary, and contents of PUCCH formats 0 to 4 is not limited to that illustrated in FIG. 2.

In, for example, FIG. 2, the PUCCH format 0 is a short PUCCH (e.g., FIG. 1A) for UCI of up to 2 bits, and will be also referred to as a sequence-based short PUCCH. The short PUCCH conveys the UCI (e.g., HARQ-ACK and/or an SR) up to 2 bits in 1 or 2 symbols.

The PUCCH format 1 is a long PUCCH (e.g., FIG. 1B) for UCI up to 2 bits. On the long PUCCH, the UCI up to 2 bits is conveyed in 4 to 14 symbols. In the PUCCH format 1, a plurality of user terminals may be subjected to Code Division Multiplexing (CDM) in an identical PRB by, for example, block-wise spreading of a time-domain using Cyclic Prefix (CS) and/or an Orthogonal Cover Code (OCC).

The PUCCH format 2 is a short PUCCH (e.g., FIG. 1A) for UCI more than 2 bits. In the short PUCCH, UCI more than 2 bits is conveyed in 1 or 2 symbols.

The PUCCH format 3 is a long PUCCH (e.g., FIG. 1B) for UCI more than 2 bits, and a plurality of user terminals can be multiplexed in an identical PRB. On the long PUCCH, UCI more than 2 bits and less than N bits (or up to the N bits) is conveyed in 4 to 14 symbols. According to the PUCCH format 3, a plurality of user terminals may be subjected to code division multiplexing in the identical PRB by block-wise spreading in the time-domain using the CS and/or the OCC. Alternatively, a plurality of user terminals may be multiplexed by using at least one of block-wise spreading (in a frequency-domain) before Discrete Fourier Transform (DFT), Frequency Division Multiplexing (FDM) and a comb-shaped subcarrier (Comb).

In addition, a threshold N of the number of bits of the UCI may be an integer larger more than 3 (or equal to or more than 3), and may be defined by a specification, or may be configured by higher layer signaling (e.g., at least one of Radio Resource Control (RRC) signaling, broadcast information (e.g., a Master Information Block (MIB), and system information (e.g., SIB: System Information Block or an RMSI: Remaining Minimum System Information)).

The PUCCH format 4 is a long PUCCH (e.g., FIG. 1B) for UCI more than 2 bits, and a single user terminal is multiplexed in the identical PRB. On the long PUCCH, UCI larger than N bits (equal to or more than the N bits) is conveyed. The PUCCH format 4 differs from the PUCCH format 3 in that a plurality of user terminals are not multiplexed in the identical PRB.

Thus, the future radio communication systems are assumed to transmit UCI by applying a plurality of PUCCH formats (short PUCCHs or long PUCCHs) based on the number of bits of the UCI to be transmitted.

Furthermore, when transmitting the UCI by using the PUCCHs, the UE allocates the UCI to a predetermined uplink control channel resource (also referred to as a PUCCH resource) to transmit. The PUCCH resource indicates a resource specified based on at least one of the time-domain, the frequency-domain and a code-domain. When the code is not used to transmit the PUCCH, it is possible to specify the PUCCH resource in the frequency-domain and/or the time-domain. Naturally, another information may be added as information that indicates the PUCCH resource.

The frequency-domain of the PUCCH resource is configured in a predetermined resource unit (e.g., PRB unit). The time-domain of the PUCCH resource is configured in, for example, a symbol unit included in a slot or in slot and symbol units. The base station may indicate a combination of a PRB and a symbol or a combination of a PRB, a symbol and code information as a PUCCH resource to the UE.

It is thought that, when the short PUCCH (e.g., PUCCH format 0) is configured by 2 symbols, a PUCCH resource allocated to each symbol is used to transmit UCI (see FIG. 3). FIG. 3 illustrates a case where a PUCCH resource #0 is provided to the first symbol of the 2 symbols, and a PUCCH resource #1 is provided to the second symbol. In this case, the UE can transmit UCI by using a plurality of (e.g., two) PUCCH resources. In addition, the PUCCH resource of each symbol is not limited to one PRB, and may be configured by a plurality of PRBs.

Furthermore, it is thought that, on another short PUCCH (e.g., PUCCH format 2) used to transmit a larger than number of bits than that of the PUCCH format 0, more PRBs are used to transmit UCI. It is thought that, when, for example, the short PUCCH is configured by 1 or 2 symbols, a plurality of contiguous or non-contiguous PRBs are configured as PUCCH resources in each symbol (see FIG. 4).

Figure 4:
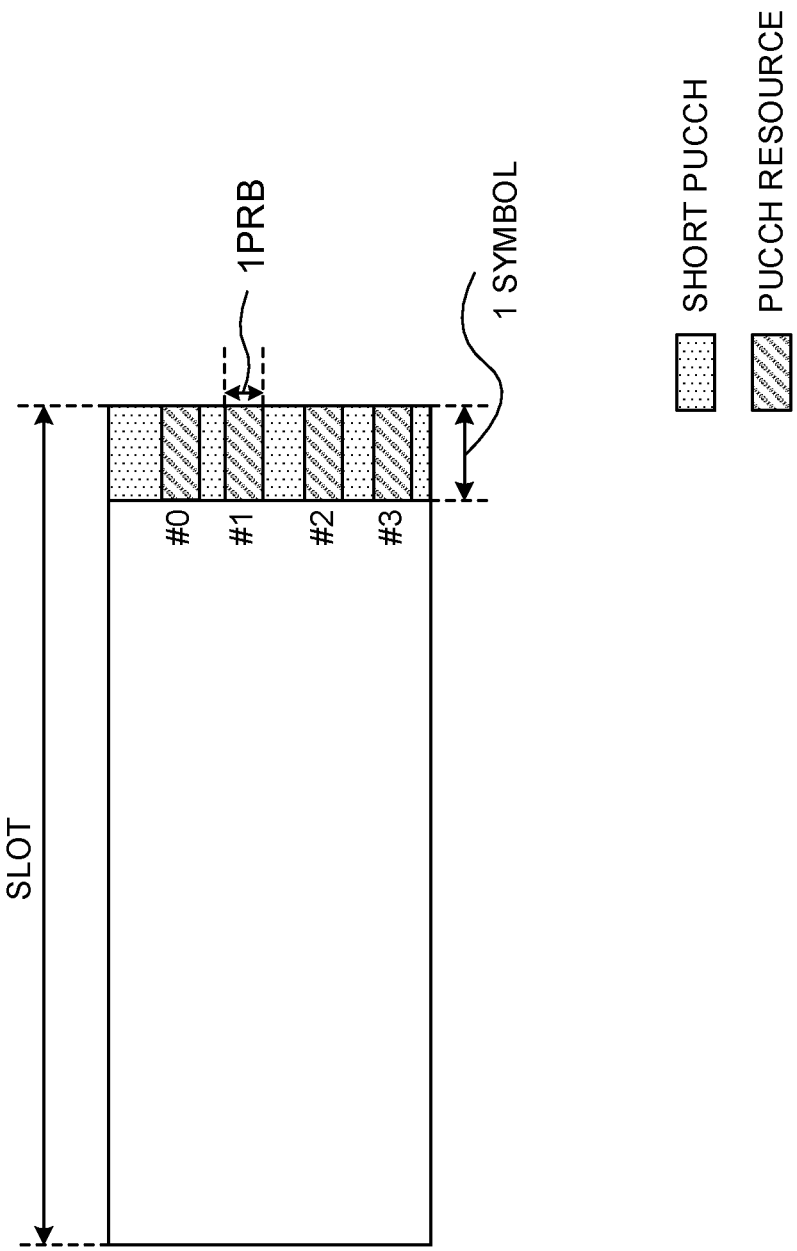
FIG. 4 is a diagram illustrating another example of allocation of the PUCCH resources of the short PUCCHs.

FIG. 4 illustrates a case where PUCCH resources (PUCCH resources #0 to #3 in this case) are configured by using four non-contiguous PRBs on a short PUCCH configured by one symbol. Each PUCCH resource is not limited to one PRB, and may be configured by a plurality of PRBs. In this case, the PRBs that compose each PUCCH resource may be configured to include a plurality of contiguous PRBs or non-contiguous PRBs. Thus, it is thought that, when the PUCCH format 2 is used, the UE transmits UCI by using a plurality of PUCCH resources configured to each of a plurality of PRBs of predetermined symbols.

Furthermore, it is thought that, on long PUCCHs (e.g., PUCCH formats 1, 3 and 4), UCI is transmitted by using PUCCH resources hopped in a frequency direction similar to PUCCHs of legacy systems (see FIG. 1B).

The legacy LTE systems have a common system band configured to the UE, and therefore applies frequency hopping to arrange PUCCHs on both ends of the system band. On the other hand, it is studied for the future radio communication systems that all UE do not perform communication by using a common system band, but the frequency-domain used for communication is individually configured per UE. For example, it is thought to configure the relatively wide first frequency band (BWP: Bandwidth part) to the UEs having high performance, and configure a narrower second BWP than the first BWP to the UEs having not so high performance.

Hence, similar to the legacy systems, frequency hopping is applied, and the PUCCHs are arranged on ends of the frequency band configured per UE. In this case, there is a risk that the PUCCHs are arranged on a plurality of domains of the system band as the number of UEs having different frequency bands increases, and resource use efficiency lowers.

Figure 5:
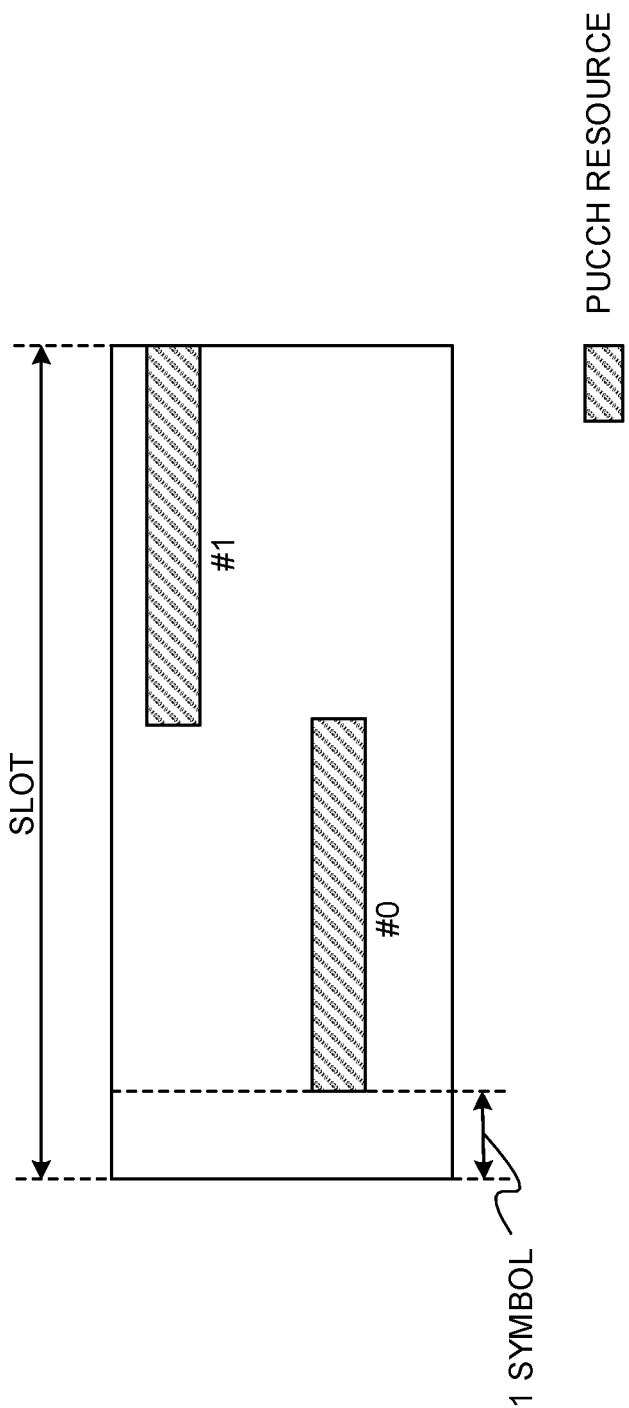
FIG. 5 is a diagram illustrating one example of allocation of PUCCH resources of the long PUCCHs.

From a viewpoint to flexibly configure the PUCCH of each UE and improve the resource use frequency, it is assumed that a PUCCH configuration domain is not necessarily limited to the ends of the frequency-domain, and is flexibly controlled. Hence, it is assumed that, even when the long PUCCHs are used, a plurality of (e.g., two) PUCCH resources are indicated by the base station before and after frequency hopping to control transmission of UCI (see FIG. 5). FIG. 5 illustrates a case where the PUCCH resources #0 and #1 are configured to the first half and the second half of the frequency hopping, respectively.

Thus, there is considered a case where, when each PUCCH format is applied, the future radio communication systems transmit UCI by using a plurality of PUCCH resources. In this case, although the UE needs to decide the PUCCH resources to be configured and control UCI transmission, a problem is how to configure and/or notify a plurality of PUCCH resources.

The inventors have focused on that it is possible to define a plurality of PUCCH resources as a combination of a plurality of PRBs when a plurality of PUCCH resources are configured, and have conceived that it is possible to suppress an increase in the number of notification bits by collectively notifying the UE of information related to a plurality of PUCCH resources (by, for example, using one DL signal). For example, according to one aspect of the present embodiment, by using downlink control information and/or higher layer signaling, a combination (set) of a plurality of PUCCH resources used for UCI transmission is configured and/or notified to the UE.

The present embodiment will be described in detail below. A configuration described in each embodiment may be applied alone or may be combined in combination. In addition, in the present embodiment, the UCI may include at least one of a Scheduling Request (SR), transmission acknowledgement information (also referred to as HARQ-ACK: Hybrid Automatic Repeat reQuest-Acknowledge, ACK or Negative ACK (NACK) or A/N) for a DL data channel (e.g., PDSCH: Physical Downlink Shared Channel), channel quality information (CQI: Channel Quality Indicator), Channel State Information (CSI) including rank information (RI: Rank Indicator), beam index information (BI: Beam Index) and a Buffer Status Report (BSR).

First Embodiment

According to the first embodiment, on a short PUCCH used for transmission of UCI more than predetermined bits (e.g., 2 bits), a plurality of PUCCH resources are notified to a UE by predetermined DCI. Although the following description assumes a PUCCH format 2 as a short PUCCH, an applicable PUCCH format is not limited to this.

A base station includes information related to a plurality of PUCCH resources configured to the PUCCH in the DCI to notify the UE. For example, the base station notifies the UE of combination information of predetermined PRBs (e.g., PRB indices) and symbols (symbol numbers) as PUCCH resources. As illustrated in FIG. 4, when four PRBs are used in predetermined symbols to configure a plurality of PUCCH resources, the base station notifies the UE of information (parameter set) including a combination of the predetermined symbol and each PRB index.

The UE assumes that a plurality of PUCCH resources are notified by the predetermined DCI (e.g., one DCI). Furthermore, the UE selects a plurality of PUCCH resources based on bit information of the received DCI, and transmits UCI by using a plurality of PUCCHs. By configuring the number of a plurality of PUCCH resources and transmitting the UCI, it is possible to decrease a code rate of the UCI. As a result, it is possible to obtain a coding gain and consequently improve an error rate of the UCI.

The base station may configure to the UE in advance the combination candidates (or a plurality of PUCCH resource set candidates) of a plurality of PUCCH resources. For example, the base station may configure the combination candidates of a plurality of PUCCH resources associated with each bit information of the DCI by using higher layer signaling (see FIG. 6).

FIG. 6 illustrates one example of a table in which each of a plurality of PUCCH resource candidates is configured by higher layer signaling to each bit information (00, 01, 10 and 11 in this case) notified by the DCI. In addition, although FIG. 6 illustrates a case where the DCI is 2 bits, the number of bits of the DCI is not limited to this. Furthermore, although FIG. 6 illustrates a case where PUCCH resources (#0 to #3) of four types at maximum are configured, the number of configurable PUCCH resources is not limited to this.

Each PUCCH resource defines a predetermined parameter set. For example, FIG. 6 illustrates a case where each of parameters A0 to A3 is configured to each bit information of the DCI for a PUCCH resource #0. Part or all of the parameters A0 to A3 may be identical or different. Furthermore, one of parameter sets (e.g., A0) is a reference value, and the other parameter sets (A1 to A3) may be defined by offsets from the reference value.

Furthermore, each of parameters B0 to B3 is configured to each bit information of the DCI for a PUCCH resource #1. Similarly, each of parameter sets C0 to C3 is configured to each bit information of the DCI for the PUCCH resource #2, and each of parameters D0 to D3 is configured to each bit information of the DCI for a PUCCH resource #3.

The parameters B0 to B3 (or C0 to C3 or D0 to D3) are configured by different values (e.g., different PRBs and/or symbols) from those of the parameter sets A0 to A3. In addition, the parameter sets B0 to B3 (or C0 to C3 or D0 to D3) may be defined by offsets from the parameter sets A0 to A3.

The parameter set only needs to include at least one of information related to a PUCCH format, information (e.g., PRB index) related to a frequency-domain, information (e.g., symbol index) related to a time-domain and information related to a code. Furthermore, the parameter set may include other information. When the table is defined per PUCCH format, the parameter may be configured not to include the information related to the PUCCH format.

Furthermore, the base station may notify the UE of information related to the number of PUCCH resources to be actually configured. For example, the base station includes the information related to the number of PUCCH resources in the DCI to notify the UE. In this case, bit information of the DCI that indicates the number of PUCCH resources may be configured to be included in a bit field different from the bit information that indicates a plurality of PUCCH resources. By additionally notifying the number of PUCCH resources by the DCI, it is possible to dynamically change the number of PUCCH resources actually used for UCI transmission.

Alternatively, the bit information of the DCI that indicates the number of PUCCH resources may be included in the bit information of the DCI that indicates a combination of a plurality of PUCCH resources to notify the UE. For example, the information related to the number of PUCCH resources may be semi-statically configured to the table by higher layer signaling (see FIG. 7).

FIG. 7 illustrates a case where each of n1 to n4 is configured to each bit information of the DCI. In addition, part or all of n1 to n4 may be the same or different. Consequently, it is possible to dynamically switch the number of PUCCH resources without increasing the number of bits of the DCI.

In addition, the number of PUCCH resources used for UCI transmission may be directly notified to the UE (or defined in the table), or information indicating a specific PUCCH resource may be notified to the UE (or defined in the table). The UE may select PUCCH resources of smaller indicates in order when the number of PUCCH resources is indicated. When, for example, the number of PUCCH resources to be indicated is 2, the UE controls transmission of UCI by using PUCCH resources #0 and #1.

Thus, by notifying the UE of the combination candidates of a plurality of resource sets by using predetermined DCI (e.g., one DCI), it is possible to suppress an increase in the number of bits used for notification of the PUCCH resources. Furthermore, by notifying the UE of the number of PUCCH resources used for UCI transmission in a certain UL transmission duration (e.g., slot), it is possible to flexibly change and control the number of PUCCH resources. Particularly even when the combination candidates of a plurality of PUCCH resources are configured, it is possible to improve PUCCH resource use efficiency by controlling transmission of the UCI based on the notified number of PUCCH resources.

Second Embodiment

According to the second embodiment, a plurality of PUCCH resources are configured to a UE by predetermined DCI on a short PUCCH used for transmission of UCI up to predetermined bits (e.g., 2 bits). Although the following description assumes a PUCCH format 0 as a short PUCCH, an applicable PUCCH format is not limited to this.

A base station includes information related to a plurality of PUCCH resources used for UCI transmission in DCI to notify the UE. For example, the base station notifies the UE of a combination of predetermined PRBs and symbols as PUCCH resources. As illustrated in FIG. 3, when two PUCCH resources #0 and #1 are configured to the short PUCCH configured over 2 symbols, the base station notifies the UE of predetermined symbols associated with the PUCCH resources #0 and #1 and each PRB index.

The UE assumes that a plurality of PUCCH resources (e.g., the PUCCH resource #0 of the first symbol and/or the PUCCH resource #1 of the second symbol) are notified by predetermined DCI (e.g., one DCI). Furthermore, the UE selects a plurality of PUCCH resources based on bit information of the received DCI, uses a plurality of PUCCHs and transmits UCI.

The base station may configure combination candidates of a plurality of PUCCH resources to the UE in advance. For example, the base station may configure the combination candidates of a plurality of PUCCH resources associated with each bit information of the DCI by using higher layer signaling (see FIG. 8).

FIG. 8 illustrates one example of a table in a case where each of a plurality of PUCCH resource candidates (the PUCCH resources #0 and #1 in this case) is configured by higher layer signaling to each bit information notified by the DCI. In addition, although FIG. 8 illustrates a case where the DCI is 2 bits, the number of bits of the DCI is not limited to this. Furthermore, although FIG. 8 illustrates a case where PUCCH resources (#0 to #1) of two types at maximum are configured, the number of configurable PUCCH resources is not limited to this.

A predetermined parameter set may be configured to each PUCCH resource. For example, FIG. 8 illustrates a case where each of parameter sets A0 to A3 is configured to each bit information of DCI for the PUCCH resource #0. Part or all of the parameter sets A0 to A3 may be identical or different. Furthermore, one of the parameter sets (e.g., A0) may be a reference value, and other parameter sets may be defined by offsets from the reference value.

Similarly, each of parameter sets B0 to B3 may be configured to each bit information of the DCI for the PUCCH resource #1. The parameter sets B0 to B3 can be configured by different values (e.g., at least one of different PRBs, symbols and code information) from those of the parameters A0 to A3. Furthermore, the parameter sets B0 to B3 may be defined by offsets from the parameter sets A0 to A3.

The parameter set only needs to include at least one of information related to a PUCCH format, information (e.g., PRB index) related to a frequency-domain, information (e.g., symbol index) related to a time-domain and information related to a code (e.g., cyclic shift). When a table is defined per PUCCH format, the parameter set may be configured not to include information related to the PUCCH format.

Furthermore, the base station may configure (notify), to the UE, information related to the number of PUCCH resources to be actually configured. For example, the base station may include the information related to the number of PUCCH resources in DCI to notify the UE. When the number of PUCCH resources configured to the table is 2, which PUCCH resource is activated or deactivated may be notified by using the DCI.

For example, whether or not the PUCCH resource is configured is notified to the UE by using DCI of 1 bit. The UE assumes that, when the bit information of the DCI is "0", the PUCCH resources #0 and #1 have been configured. Furthermore, the UE assumes that, when the bit information of the DCI is "1", one PUCCH resource (e.g., PUCCH #0) is configured, and the other PUCCH resource is not configured.

By notifying by DCI the number of PUCCH resources to be actually used, it is possible to dynamically switch the number of PUCCH resources (or the number of symbols of the PUCCH) used for UCI transmission.

Alternatively, bit information of the DCI that indicates the number of PUCCH resources may be included in the bit information of the DCI that indicates a combination of a plurality of PUCCH resources and notified to the UE. For example, information related to the number of PUCCH resources (e.g., resources to be activated and resources to be deactivated) may be configured to the table by higher layer signaling (see FIG. 9). Consequently, it is possible to dynamically switch the number of PUCCH resources (or the number of symbols of the PUCCH used for UCI transmission) without increasing the number of bits of the DCI.

In addition, the number of PUCCH resources used for UCI transmission may be directly notified to the UE (or defined in the table), and information indicating a specific PUCCH resource may be notified to the UE (or defined in the table). When the number of PUCCH resources is indicated, the UE may select PUCCH resources of smaller indices in order. When, for example, the number of PUCCH resources is 1, the UE controls transmission of UCI assuming that the PUCCH resource #0 is configured.

Consequently, by notifying the UE of combination candidates of a plurality of resource sets by using predetermined DCI (e.g., one DCI), it is possible to suppress an increase in the number of bits used for notification of the PUCCH resources. Furthermore, by notifying the number of PUCCH resources configured for UCI transmission of a certain UL transmission duration (e.g., slot), it is possible to flexibly change and control the number of PUCCH resources (or the number of symbols of the PUCCH). Particularly even when the combination candidates of a plurality of PUCCH resources are configured, it is possible to improve PUCCH resource use efficiency by controlling transmission of the UCI based on the notified number of PUCCH resources.

Third Embodiment

According to the third embodiment, on a long PUCCH, a plurality of PUCCH resources are configured to a UE by predetermined DCI. Although the following description assumes at least one of PUCCH formats 1, 3 and 4 as a long PUCCH, an applicable PUCCH format is not limited to this.

A base station includes information related to a plurality of PUCCH resources in DCI to notify the UE. For example, the base station indicates the PUCCH resources by a predetermined PRB and/or a symbol to notify the UE. As illustrated in FIG. 5, when application of frequency hopping to the long PUCCH is supported, the base station notifies the UE of the first half (first hop) and/or the second half (second hop) of the frequency hopping as the PUCCH resources (#0 and/or #1).

The UE assumes that a plurality of PUCCH resources (e.g., the PUCCH resource #0 of the first half and/or the PUCCH resource #1 of the second half of the frequency hopping) are notified by predetermined DCI. Furthermore, the UE selects one or a plurality of PUCCH resources based on bit information of the received DCI, and transmits UCI.

The base station may configure combination candidates of a plurality of PUCCH resources to the UE in advance. For example, the base station may configure the combination candidates of a plurality of PUCCH resources associated with each bit information of the DCI by using higher layer signaling (see FIG. 8).

FIG. 8 illustrates one example of a table in which each of a plurality of PUCCH resource candidates (the PUCCH resource #0 of the first half and the PUCCH resource #1 of the second half of the frequency hopping in this case) is configured to each bit information notified by the DCI by higher layer signaling. In addition, although FIG. 8 illustrates a case where DCI is 2 bits, the number of bits of the DCI is not limited to this. Furthermore, although FIG. 8 illustrates a case where PUCCH resources (#0 to #1) of the two types at maximum are configured, the number of configurable PUCCH resources is not limited to this.

A predetermined parameter set may be configured to each PUCCH resource. For example, FIG. 8 illustrates a case where each of parameter sets A0 to A3 is configured to each bit information of DCI for the PUCCH resource #0. Part or all of the parameter sets A0 top A3 may be identical or different. Furthermore, one of the parameter sets (e.g., A0) may be a reference value, and other parameter sets may be defined by offsets from the reference value.

Similarly, each of parameter sets B0 to B3 is configured to each bit information of the DCI for the PUCCH resource #1. The parameter sets B0 to B3 can be configured by different values (e.g., at least one of different PRBs, symbols and cyclic shifts) from those of the parameter sets A0 to A3. Furthermore, the parameter sets B0 and B3 may be defined by offsets from the parameter sets A0 to A3.

The parameter set only needs to include at least one of information related to a PUCCH format, information (e.g., PRB index) related to a frequency-domain, information (e.g., symbol index) related to a time-domain and information related to a code. When the table is defined per PUCCH format, the parameter may be configured not to include the information related to the PUCCH format.

Furthermore, when a plurality of PUCCH formats (e.g., the PUCCH formats #1, #3 and #4) are configured to the identical table, the parameter set may include information that indicates a PUCCH format. Furthermore, contents (e.g., the number of parameters and/or a type) included in the parameter set may differ PUCCH format. Consequently, even when a common table is used, it is possible to flexibly define information that is necessary per PUCCH format to notify the UE.

Furthermore, the base station may configure (notify), to the UE, information related to the number of PUCCH resources to be actually configured. For example, the base station may include the information related to the number of PUCCH resources in DCI to notify the UE. When the number of PUCCH resources configured to the table is 2, which PUCCH resource is activated or deactivated may be notified by using the DCI.

For example, whether or not to configure the PUCCH resource is notified to the UE by using DCI of 1 bit. The UE assumes that, when the bit information of the DCI is "0", the PUCCH resources #0 and #1 have been configured. Furthermore, the UE assumes that, when the bit information of the DCI is "1", one PUCCH resource (e.g., PUCCH #0) is configured, and the other PUCCH resource is not configured.

By notifying the number of PUCCH resources to be configured actually used by using the DCI, it is possible to dynamically switch the number of PUCCH resources used for UCI transmission. Furthermore, when frequency hopping for the long PUCCH is supported, it is possible to dynamically switch whether or not to apply the frequency hopping by notifying the number of PUCCH resources (whether to activate one of the first half and the second half of the frequency hopping or both).

Alternatively, the bit information of the DCI that indicates the number of PUCCH resources may be included in the bit information of the DCI that indicates a combination of a plurality of PUCCH resources to notify the UE. For example, information (e.g., resources to be activated and resources to be deactivated) related to the number of PUCCH resources (or whether or not to apply frequency hopping) may be also configured to the table by higher layer signaling (see FIG. 9). Consequently, it is possible to dynamically switch the number of PUCCH resources (or whether or not to apply frequency hopping) without increasing the number of bits of the DCI.

In addition, the number of PUCCH resources used for UCI transmission may be directly notified to the UE (or defined in the table), and information indicating specific PUCCH resources (e.g., the PUCCH resource of the first half and/or the PUCCH resource of the second half of the frequency hopping) may be notified to the UE (or defined in the table). When the number of PUCCH resources is indicated, the UE may select PUCCH resources of smaller indices in order. When, for example, the number of PUCCH resources is 1, the UE assumes that the PUCCH resource #0 of the first half of the frequency hopping is configured, and controls transmission of the UCI.

Thus, by notifying the UE of the combination candidates of a plurality of resource sets by using predetermined DCI (e.g., one DCI), it is possible to suppress an increase in the number of bits used for notification of the PUCCH resources. Furthermore, by notifying the number of PUCCH resources configured for UCI transmission of a certain UL transmission duration (e.g., slot), it is possible to flexibly change and control the number of PUCCH resources (or whether or not to apply the frequency hopping). Particularly even when the combination candidates of a plurality of PUCCH resources are configured, it is possible to improve PUCCH resource use efficiency by controlling transmission of the UCI based on the notified number of PUCCH resources.

Modified Example

In addition, PUCCH resource candidates of part or all of PUCCH formats 0, 1, 2, 3 and 4 indicated in the first embodiment to the third embodiment may be configured to a common table. It is also considered that, when, for example, the PUCCH format 2 and the PUCCH format 0 are configured to the same table, the number of PUCCH resources that are necessary for the PUCCH format 0 does not need to be 4. In this case, information related to the number of PUCCH resources to be actually configured only needs to be notified to the UE to control the number of PUCCH resources. Consequently, even when the number of PUCCH resource candidates that is necessary per PUCCH format is different, it is possible to appropriately configure the PUCCH resource candidates to the same table.

(Radio Communication System)

The configuration of the radio communication system according to one embodiment of the present invention will be described below. This radio communication system uses one or a combination of the radio communication method according to each of the above embodiments of the present invention to perform communication.

Figure 10:
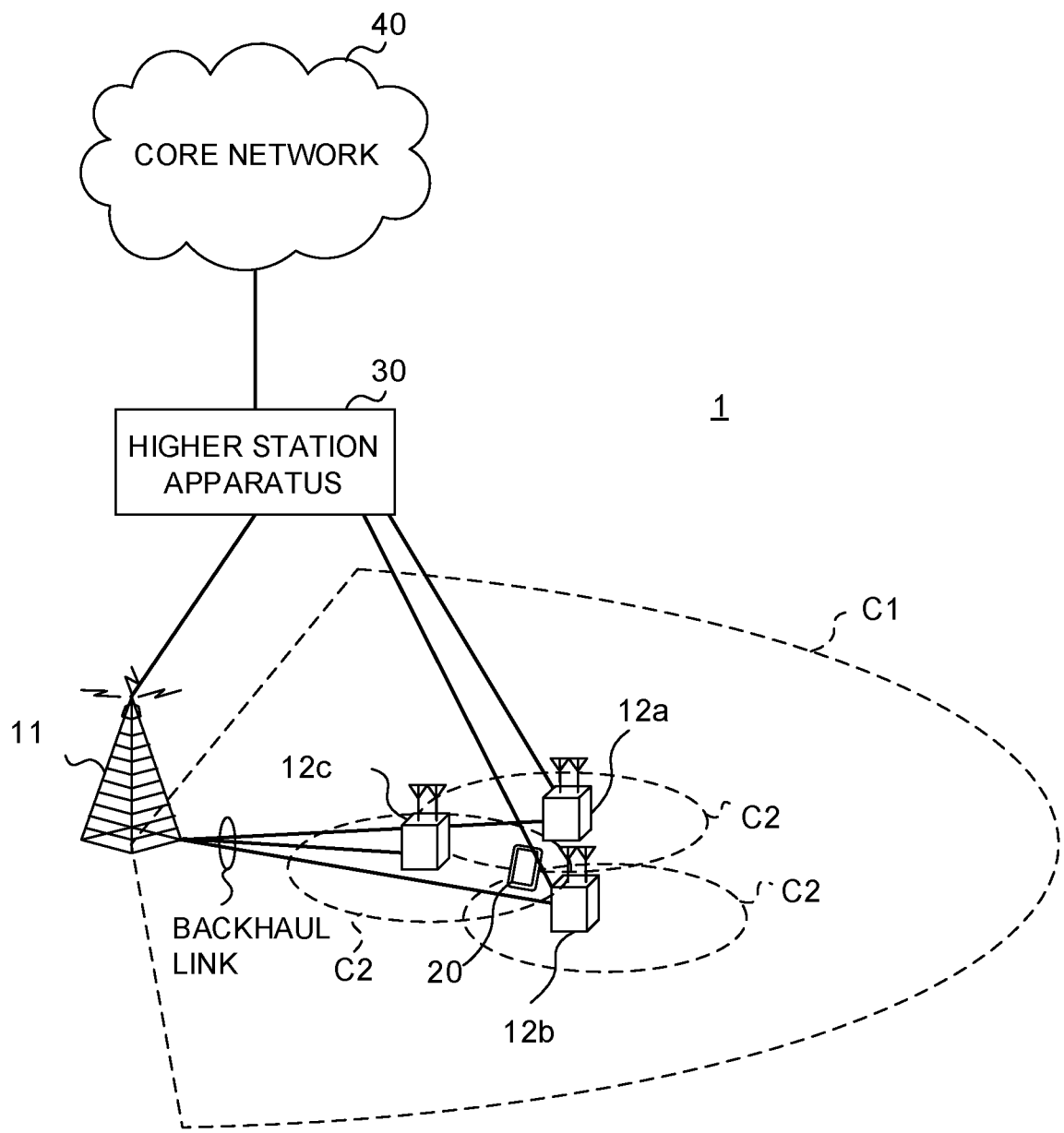
FIG. 10 is a diagram illustrating one example of a schematic configuration of a radio communication system according to the present embodiment.

FIG. 10 is a diagram illustrating one example of a schematic configuration of the radio communication system according to the one embodiment of the present invention. A radio communication system 1 can apply Carrier Aggregation (CA) and/or Dual Connectivity (DC) that aggregate a plurality of base frequency blocks (component carriers) whose one unit is a system bandwidth (e.g., 20 MHz) of the LTE system.

In this regard, the radio communication system 1 may be referred to as Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT) and New Radio (NR), or a system that realizes these techniques.

The radio communication system 1 includes a radio base station 11 that forms a macro cell C1 of a relatively wide coverage, and radio base stations 12 (12a to 12c) that are located in the macro cell C1 and form small cells C2 narrower than the macro cell C1. Furthermore, a user terminal 20 is located in the macro cell C1 and each small cell C2. An arrangement of each cell and a user terminal 20 is not limited to that illustrated in FIG. 10.

The user terminal 20 can connect with both of the radio base station 11 and the radio base stations 12. The user terminal 20 is assumed to concurrently use the macro cell C1 and the small cells C2 by CA or DC. Furthermore, the user terminal 20 can apply CA or DC by using a plurality of cells (CCs) (e.g., five CCs or less or six CCs or more).

The user terminal 20 and the radio base station 11 can communicate by using a carrier (also referred to as a legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz or 5 GHz) or may use the same carrier as that used between the user terminal 20 and the radio base station 11. In this regard, a configuration of the frequency band used by each radio base station is not limited to this.

The radio base station 11 and each radio base station 12 (or the two radio base stations 12) can be configured to be connected by way of wired connection (e.g., optical fibers compliant with a Common Public Radio Interface (CPRI) or an ×2 interface) or by way of radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmission/reception point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmission/reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal (mobile station) but also a fixed communication terminal (fixed station).

The radio communication system 1 applies Orthogonal Frequency-Division Multiple Access (OFDMA) to downlink and Single Carrier Frequency Division Multiple Access (SC-FDMA) to uplink as radio access schemes.

OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into a band including one or contiguous resource blocks per terminal and causes a plurality of terminals to use respectively different bands to reduce an inter-terminal interference. In this regard, uplink and downlink radio access schemes are not limited to a combination of these, and other radio access schemes may be used for the uplink and downlink radio access schemes.

The radio communication system 1 may be configured to apply different numerologies in a cell and/or between cells. In addition, the numerologies refer to, for example, communication parameters (e.g., a subcarrier spacing and a bandwidth) that are applied to transmission and reception of a certain signal.

The radio communication system 1 uses a downlink shared channel (PDSCH: Physical Downlink Shared Channel) shared by each user terminal 20, a broadcast channel (PBCH: Physical Broadcast Channel) and a downlink L1/L2 control channel as downlink channels. User data, higher layer control information and System Information Blocks (SIBs) are conveyed on the PDSCH. Furthermore, Master Information Blocks (MIBs) are conveyed on the PBCH.

The downlink L1/L2 control channel includes a Physical Downlink Control Channel (PDCCH), an Enhanced Physical Downlink Control Channel (EPDCCH), a Physical Control Format Indicator Channel (PCFICH), and a Physical Hybrid-ARQ Indicator Channel (PHICH). Downlink Control Information (DCI) including scheduling information of the PDSCH and the PUSCH is conveyed on the PDCCH. The number of OFDM symbols used for the PDCCH is conveyed on the PCFICH. Transmission acknowledgement information (also referred to as, for example, retransmission control information, HARQ-ACK or ACK/NACK) of a Hybrid Automatic Repeat reQuest (HARQ) for the PUSCH is conveyed on the PHICH. The EPDCCH is subjected to frequency division multiplexing with the PDSCH (downlink shared data channel) and is used to convey DCI similar to the PDCCH.

The radio communication system 1 uses an uplink shared channel (PUSCH: Physical Uplink Shared Channel) shared by each user terminal 20, an uplink control channel (PUCCH: Physical Uplink Control Channel), and a random access channel (PRACH: Physical Random Access Channel) as uplink channels. User data and higher layer control information are conveyed on the PUSCH. Furthermore, downlink radio quality information (CQI: Channel Quality Indicator) and transmission acknowledgement information are conveyed on the PUCCH. A random access preamble for establishing connection with a cell is conveyed on the PRACH.

The radio communication system 1 conveys a Cell-specific Reference Signal (CRS), a Channel State Information-Reference Signal (CSI-RS), a DeModulation Reference Signal (DMRS) and a Positioning Reference Signal (PRS) as downlink reference signals. Furthermore, the radio communication system 1 conveys a Sounding Reference Signal (SRS) and a DeModulation Reference Signal (DMRS) as uplink reference signals. In this regard, the DMRS may be referred to as a user terminal specific reference signal (UE-specific Reference Signal). Furthermore, a reference signal to be conveyed is not limited to these.

(Radio Base Station)

Figure 11:
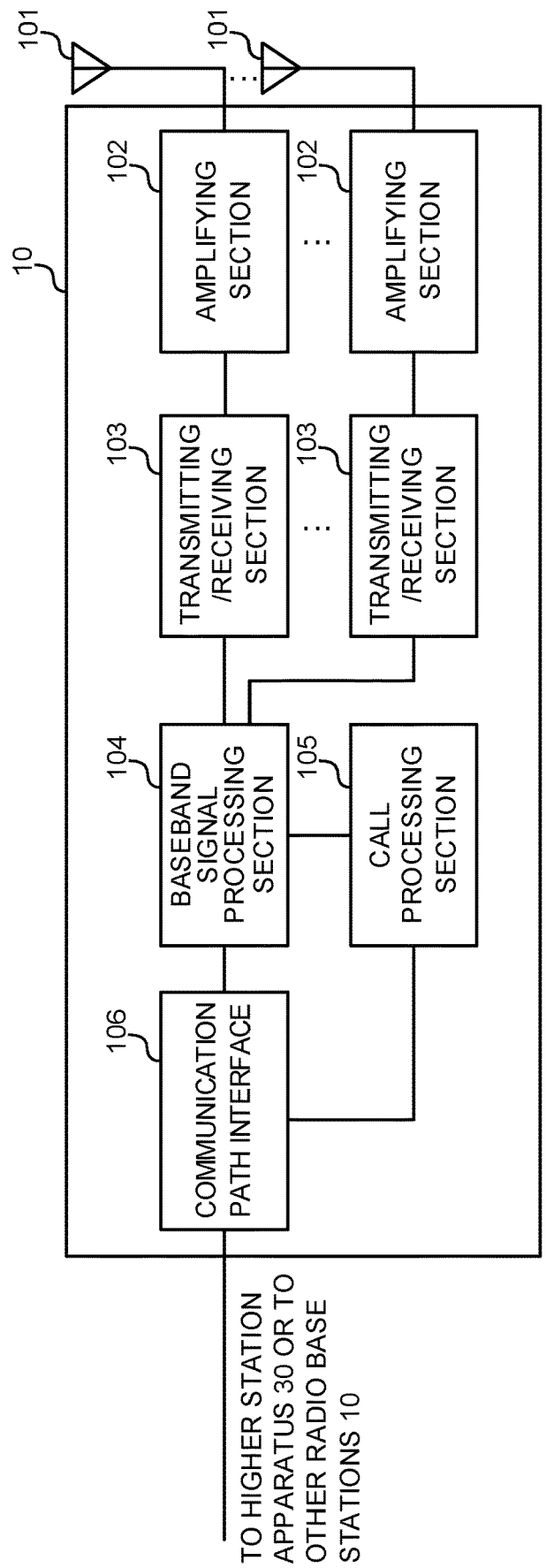
FIG. 11 is a diagram illustrating one example of an overall configuration of a radio base station according to the present embodiment.

FIG. 11 is a diagram illustrating one example of an overall configuration of the radio base station according to the one embodiment of the present invention. The radio base station 10 includes pluralities of transmission/reception antennas 101, amplifying sections 102 and transmitting/receiving sections 103, a baseband signal processing section 104, a call processing section 105 and a communication path interface 106. In this regard, the radio base station 10 only needs to be configured to include one or more of each of the transmission/reception antennas 101, the amplifying sections 102 and the transmitting/receiving sections 103.

User data transmitted from the radio base station 10 to the user terminal 20 on downlink is input from the higher station apparatus 30 to the baseband signal processing section 104 via the communication path interface 106.

The baseband signal processing section 104 performs processing of a Packet Data Convergence Protocol (PDCP) layer, segmentation and concatenation of the user data, transmission processing of a Radio Link Control (RLC) layer such as RLC retransmission control, Medium Access Control (MAC) retransmission control (e.g., HARQ transmission processing), and transmission processing such as scheduling, transmission format selection, channel coding, Inverse Fast Fourier Transform (IFFT) processing, and precoding processing on the user data, and transfers the user data to each transmitting/receiving section 103. Furthermore, the baseband signal processing section 104 performs transmission processing such as channel coding and inverse fast Fourier transform on a downlink control signal, too, and transfers the downlink control signal to each transmitting/receiving section 103.

Each transmitting/receiving section 103 converts a baseband signal precoded and output per antenna from the baseband signal processing section 104 into a radio frequency band, and transmits a radio frequency signal. The radio frequency signal subjected to frequency conversion by each transmitting/receiving section 103 is amplified by each amplifying section 102, and is transmitted from each transmission/reception antenna 101. The transmitting/receiving sections 103 can be composed of transmitters/receivers, transmission/reception circuits or transmission/reception apparatuses described based on a common knowledge in a technical field according to the present invention. In this regard, the transmitting/receiving sections 103 may be composed as an integrated transmitting/receiving section or may be composed of transmission sections and reception sections.

Meanwhile, each amplifying section 102 amplifies a radio frequency signal received by each transmission/reception antenna 101 as an uplink signal. Each transmitting/receiving section 103 receives the uplink signal amplified by each amplifying section 102. Each transmitting/receiving section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, reception processing of MAC retransmission control, and reception processing of an RLC layer and a PDCP layer on user data included in the input uplink signal, and transfers the user data to the higher station apparatus 30 via the communication path interface 106. The call processing section 105 performs call processing (such as a configuration and release) of a communication channel, state management of the radio base station 10, and radio resource management.

The communication path interface 106 transmits and receives signals to and from the higher station apparatus 30 via a predetermined interface. Furthermore, the communication path interface 106 may transmit and receive (backhaul signaling) signals to and from the another radio base station 10 via an inter-base station interface (e.g., optical fibers compliant with the Common Public Radio Interface (CPRI) or the x2 interface).

Each transmitting/receiving section 103 transmits predetermined downlink control information including information related to a plurality of uplink control channel resources. Furthermore, each transmitting/receiving section 103 transmits combination candidates of a plurality of uplink control channel resources associated with each bit information of the predetermined downlink control information by higher layer signaling (see FIGS. 6 to 9). Furthermore, each transmitting/receiving section 103 receives Uplink Control Information (UCI) by using one or more uplink control channel resources. Furthermore, each transmitting/receiving section 103 may transmit information indicating the number of uplink control channel resources used for transmission of UCI (see FIGS. 7 and 9).

Figure 12:
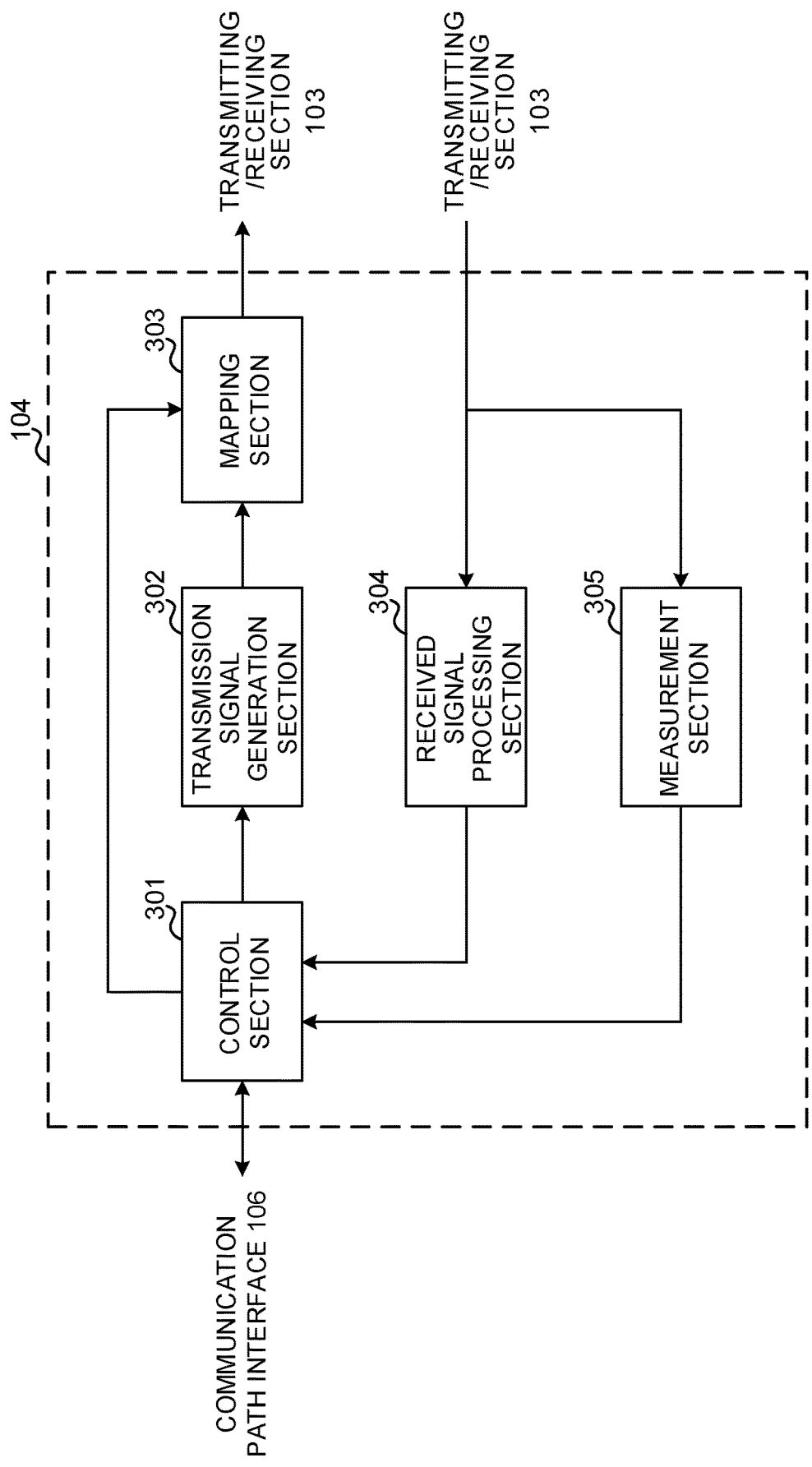
FIG. 12 is a diagram illustrating one example of a function configuration of the radio base station according to the present embodiment.

FIG. 12 is a diagram illustrating one example of a function configuration of the radio base station according to the one embodiment of the present invention. In addition, this example mainly illustrates function blocks of characteristic portions according to the present embodiment, and assumes that the radio base station 10 includes other function blocks, too, that are necessary for radio communication.

The baseband signal processing section 104 includes at least a control section (scheduler) 301, a transmission signal generation section 302, a mapping section 303, a received signal processing section 304 and a measurement section 305. In addition, these components only need to be included in the radio base station 10, and part or all of the components may not be included in the baseband signal processing section 104.

The control section (scheduler) 301 controls the entire radio base station 10. The control section 301 can be composed of a controller, a control circuit or a control apparatus described based on the common knowledge in the technical field according to the present invention.

The control section 301 controls, for example, signal generation of the transmission signal generation section 302 and signal allocation of the mapping section 303. Furthermore, the control section 301 controls signal reception processing of the received signal processing section 304 and signal measurement of the measurement section 305.

The control section 301 controls scheduling (e.g., resource allocation) of system information, a downlink data signal (e.g., a signal transmitted on the PDSCH), and a downlink control signal (e.g., a signal conveyed on the PDCCH, the EPDCCH or an NR-PDCCH). Furthermore, the control section 301 controls generation of a downlink control signal (e.g., transmission acknowledgement information) and a downlink data signal based on a result obtained by deciding whether or not it is necessary to perform retransmission control on an uplink data signal. Furthermore, the control section 301 controls scheduling of synchronization signals (e.g., a Primary Synchronization Signal (PSS)/a Secondary Synchronization Signal (SSS)) and downlink reference signals (e.g., a CRS, a CSI-RS and a DMRS).

Furthermore, the control section 301 controls scheduling of an uplink data signal (e.g., a signal transmitted on the PUSCH), an uplink control signal (e.g., a signal transmitted on the PUCCH and/or the PUSCH), a random access preamble transmitted on the PRACH, and an uplink reference signal.

The control section 301 performs control to notify a UE of PUCCH resources used for transmission of UCI.

The transmission signal generation section 302 generates a downlink signal (such as a downlink control signal, a downlink data signal or a downlink reference signal) based on an instruction from the control section 301, and outputs the downlink signal to the mapping section 303. The transmission signal generation section 302 can be composed of a signal generator, a signal generating circuit or a signal generating apparatus described based on the common knowledge in the technical field according to the present invention.

The transmission signal generation section 302 generates, for example, a DL assignment for notifying downlink signal allocation information, and a UL grant for notifying uplink signal allocation information based on the instruction from the control section 301. Furthermore, the transmission signal generation section 302 performs encoding processing and modulation processing on a downlink data signal according to a code rate and a modulation scheme determined based on Channel State Information (CSI) from each user terminal 20.

The mapping section 303 maps the downlink signal generated by the transmission signal generation section 302, on the above predetermined radio resource based on the instruction from the control section 301, and outputs the downlink signal to each transmitting/receiving section 103. The mapping section 303 can be composed of a mapper, a mapping circuit or a mapping apparatus described based on the common knowledge in the technical field according to the present invention.

The received signal processing section 304 performs reception processing (e.g., demapping, demodulation and decoding) on a received signal input from each transmitting/receiving section 103. In this regard, the received signal is, for example, an uplink signal (such as an uplink control signal, an uplink data signal or an uplink reference signal) transmitted from the user terminal 20. The received signal processing section 304 can be composed of a signal processor, a signal processing circuit or a signal processing apparatus described based on the common knowledge in the technical field according to the present invention.

The received signal processing section 304 outputs information decoded by the reception processing to the control section 301. When, for example, receiving the PUCCH including HARQ-ACK, the received signal processing section 304 outputs the PUCCH to the control section 301. Furthermore, the received signal processing section 304 outputs the received signal and/or the signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present invention.

The measurement section 305 may measure, for example, received power (e.g., Reference Signal Received Power (RSRP)), received quality (e.g., Reference Signal Received Quality (RSRQ) or a Signal to Interference plus Noise Ratio (SINR)) or uplink channel information (e.g., CSI) of the received signal. The measurement section 305 may output a measurement result to the control section 301.

(User Terminal)

Figure 13:
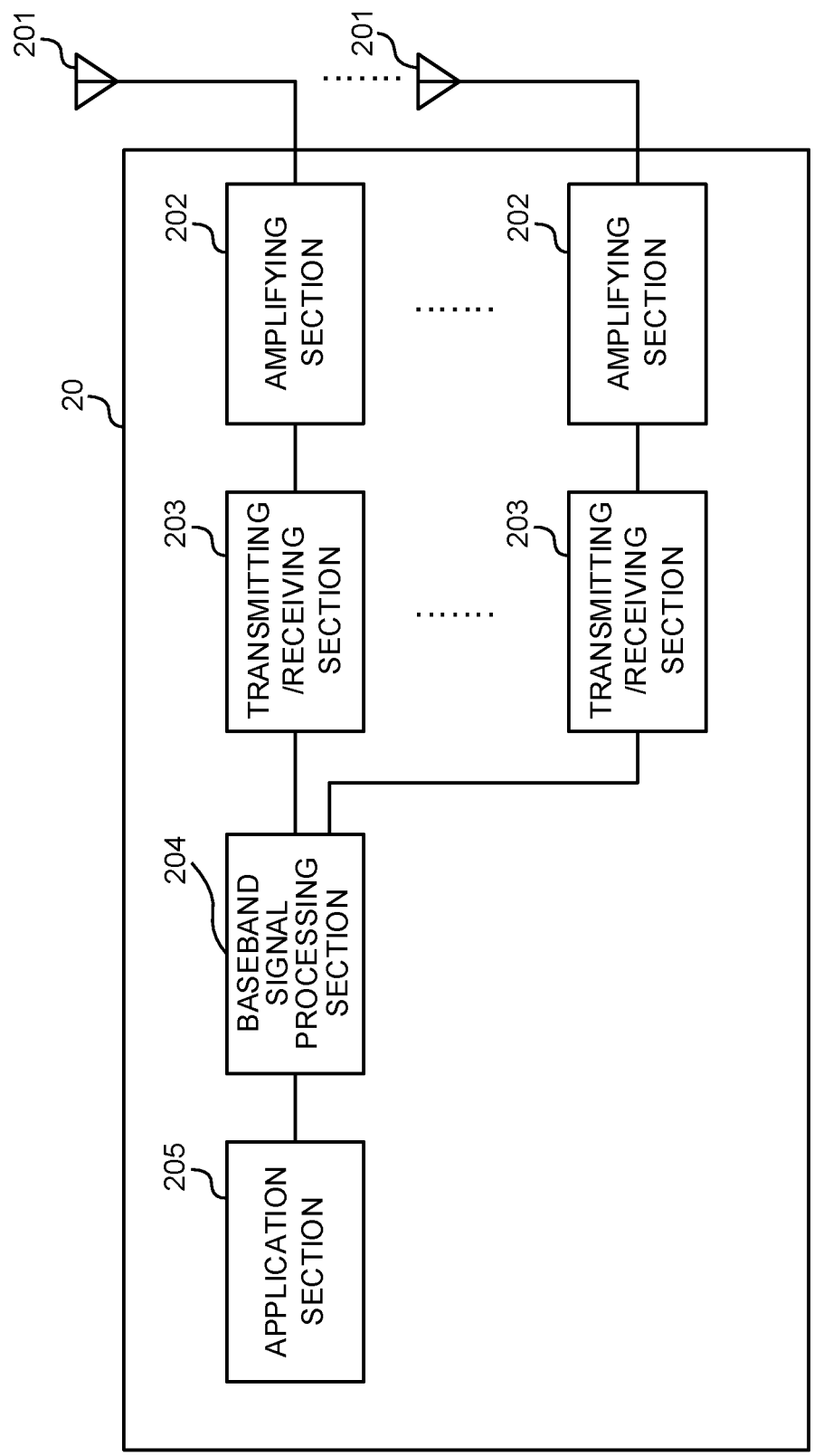
FIG. 13 is a diagram illustrating one example of an overall configuration of a user terminal according to the present embodiment.

FIG. 13 is a diagram illustrating one example of an overall configuration of the user terminal according to the one embodiment of the present invention. The user terminal 20 includes pluralities of transmission/reception antennas 201, amplifying sections 202 and transmitting/receiving sections 203, a baseband signal processing section 204 and an application section 205. In this regard, the user terminal 20 only needs to be configured to include one or more of each of the transmission/reception antennas 201, the amplifying sections 202 and the transmitting/receiving sections 203.

Each amplifying section 202 amplifies a radio frequency signal received at each transmission/reception antenna 201. Each transmitting/receiving section 203 receives a downlink signal amplified by each amplifying section 202. Each transmitting/receiving section 203 performs frequency conversion on the received signal into a baseband signal, and outputs the baseband signal to the baseband signal processing section 204. The transmitting/receiving sections 203 can be composed of transmitters/receivers, transmission/reception circuits or transmission/reception apparatuses described based on the common knowledge in the technical field according to the present invention. In this regard, the transmitting/receiving sections 203 may be composed as an integrated transmitting/receiving section or may be composed of transmission sections and reception sections.

The baseband signal processing section 204 performs FFT processing, error correcting decoding, and reception processing of retransmission control on the input baseband signal. The baseband signal processing section 204 transfers downlink user data to the application section 205. The application section 205 performs processing related to layers higher than a physical layer and an MAC layer. Furthermore, the baseband signal processing section 204 may transfer broadcast information of the downlink data, too, to the application section 205.

On the other hand, the application section 205 inputs uplink user data to the baseband signal processing section 204. The baseband signal processing section 204 performs transmission processing of retransmission control (e.g., HARQ transmission processing), channel coding, precoding, Discrete Fourier Transform (DFT) processing and IFFT processing on the uplink user data, and transfers the uplink user data to each transmitting/receiving section 203. Each transmitting/receiving section 203 converts the baseband signal output from the baseband signal processing section 204 into a radio frequency band, and transmits a radio frequency signal. The radio frequency signal subjected to the frequency conversion by each transmitting/receiving section 203 is amplified by each amplifying section 202, and is transmitted from each transmission/reception antenna 201.

Each transmitting/receiving section 203 receives predetermined downlink control information including information related to a plurality of uplink control channel resources. Furthermore, each transmitting/receiving section 203 receives combination candidates of a plurality of uplink control channel resources associated with each bit information of the predetermined downlink control information by higher layer signaling (see FIGS. 6 to 9). Furthermore, each transmitting/receiving section 203 transmits Uplink Control Information (UCI) by using one or more uplink control channel resources. Furthermore, each transmitting/receiving section 203 may receive information indicating the number of uplink control channel resources used for transmission of UCI (see FIGS. 7 and 9).

Figure 14:
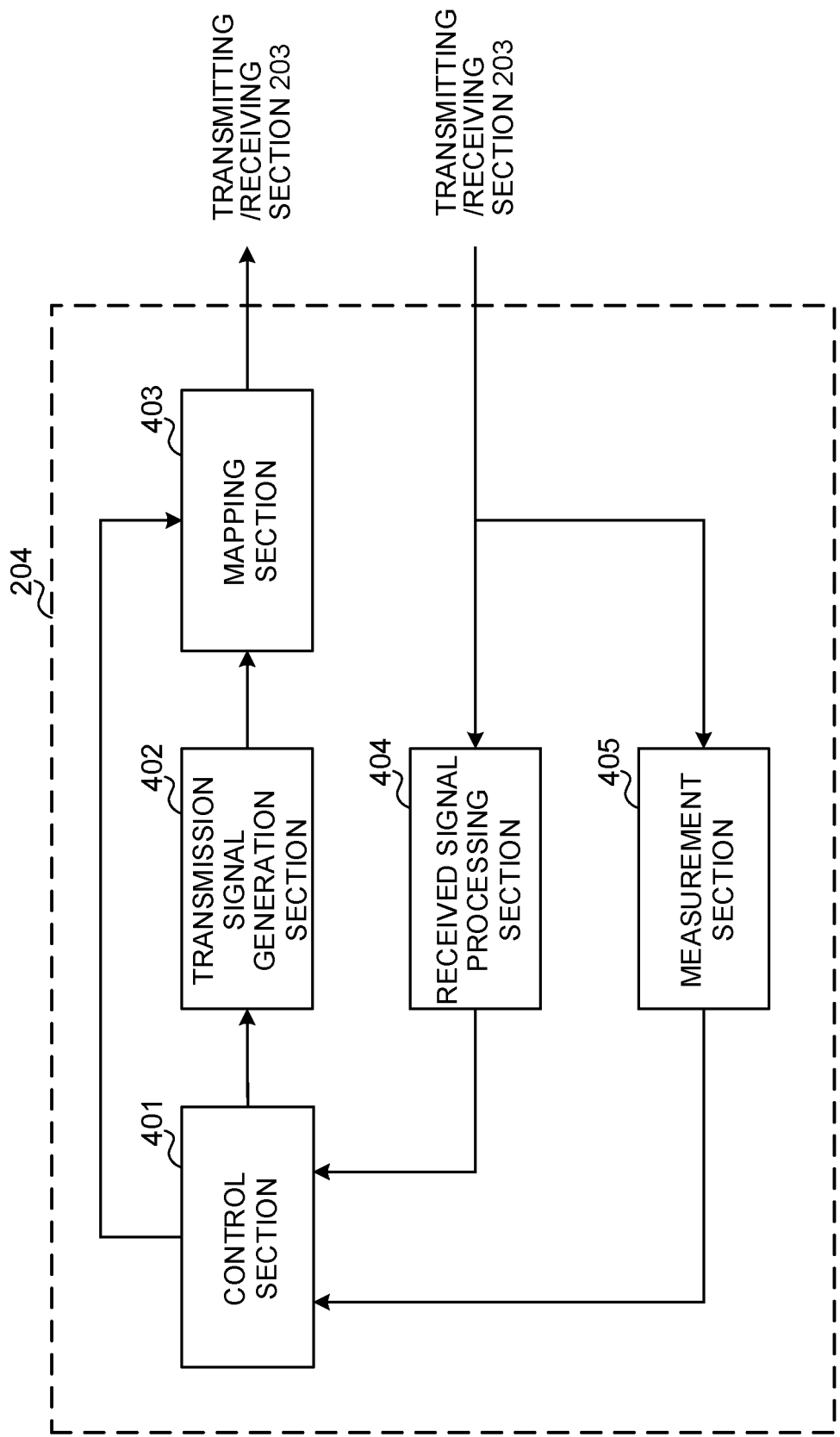
FIG. 14 is a diagram illustrating one example of a function configuration of the user terminal according to the present embodiment.

FIG. 14 is a diagram illustrating one example of a function configuration of the user terminal according to the one embodiment of the present invention. In addition, this example mainly illustrates function blocks of characteristic portions according to the present embodiment, and assumes that the user terminal 20 includes other function blocks, too, that are necessary for radio communication.

The baseband signal processing section 204 of the user terminal 20 includes at least a control section 401, a transmission signal generation section 402, a mapping section 403, a received signal processing section 404 and a measurement section 405. In addition, these components only need to be included in the user terminal 20, and part or all of the components may not be included in the baseband signal processing section 204.

The control section 401 controls the entire user terminal 20. The control section 401 can be composed of a controller, a control circuit or a control apparatus described based on the common knowledge in the technical field according to the present invention.

The control section 401 controls, for example, signal generation of the transmission signal generation section 402 and signal allocation of the mapping section 403. Furthermore, the control section 401 controls signal reception processing of the received signal processing section 404 and signal measurement of the measurement section 405.

The control section 401 controls transmission of UCI based on predetermined downlink control information including information related to a plurality of uplink control channel resources. Furthermore, the control section 401 may determine the number of uplink control channel resources used for transmission of UCI based on the number of uplink control channel resources used for transmission of the UCI included in the predetermined downlink control information.

The control section 401 may select PUCCH resources used for UCI transmission based on a table that defines combination candidates of a plurality of uplink control channel resources associated with each bit information of the predetermined downlink control information, and predetermined DCI notified from the base station. In addition, a first uplink control channel format and a second uplink control channel format defined in the table may have different numbers of uplink control channel resources configured by higher layer signaling.

Furthermore, the control section 401 may decide whether or not to apply frequency hopping and/or the number of symbols of the uplink control channel to be configured based on the number of uplink control channel resources indicated by the predetermined downlink control information.

The transmission signal generation section 402 generates an uplink signal (such as an uplink control signal, an uplink data signal or an uplink reference signal) based on an instruction from the control section 401, and outputs the uplink signal to the mapping section 403. The transmission signal generation section 402 can be composed of a signal generator, a signal generating circuit or a signal generating apparatus described based on the common knowledge in the technical field according to the present invention.

For example, the transmission signal generation section 402 generates an uplink control signal related to transmission acknowledgement information and Channel State Information (CSI) based on, for example, the instruction from the control section 401. Furthermore, the transmission signal generation section 402 generates an uplink data signal based on the instruction from the control section 401. When, for example, the downlink control signal notified from the radio base station 10 includes a UL grant, the transmission signal generation section 402 is instructed by the control section 401 to generate an uplink data signal.

The mapping section 403 maps the uplink signal generated by the transmission signal generation section 402, on a radio resource based on the instruction from the control section 401, and outputs the uplink signal to each transmitting/receiving section 203. The mapping section 403 can be composed of a mapper, a mapping circuit or a mapping apparatus described based on the common knowledge in the technical field according to the present invention.

The received signal processing section 404 performs reception processing (e.g., demapping, demodulation and decoding) on the received signal input from each transmitting/receiving section 203. In this regard, the received signal is, for example, a downlink signal (such as a downlink control signal, a downlink data signal or a downlink reference signal) transmitted from the radio base station 10. The received signal processing section 404 can be composed of a signal processor, a signal processing circuit or a signal processing apparatus described based on the common knowledge in the technical field according to the present invention. Furthermore, the received signal processing section 404 can compose the reception section according to the present invention.

The received signal processing section 404 outputs information decoded by the reception processing to the control section 401. The received signal processing section 404 outputs, for example, broadcast information, system information, RRC signaling and DCI to the control section 401. Furthermore, the received signal processing section 404 outputs the received signal and/or the signal after the reception processing to the measurement section 405.

The measurement section 405 performs measurement related to the received signal. For example, the measurement section 405 performs measurement by using a downlink reference signal transmitted from the radio base station 10. The measurement section 405 can be composed of a measurement instrument, a measurement circuit or a measurement apparatus described based on the common knowledge in the technical field according to the present invention.

The measurement section 405 may measure received power (e.g., RSRP), received quality (e.g., RSRQ or a received SINR) or downlink channel information (e.g., CSI) of the received signal. The measurement section 405 may output a measurement result to the control section 401.

(Hardware Configuration)

In addition, the block diagrams used to describe the above embodiments illustrate blocks in function units. These function blocks (components) are realized by an optional combination of hardware and/or software. Furthermore, means for realizing each function block is not limited in particular. That is, each function block may be realized by one physically and/or logically coupled apparatus or may be realized by a plurality of these apparatuses formed by connecting two or more physically and/or logically separate apparatuses directly and/or indirectly (by way of, for example, wired connection and/or radio connection).

Figure 15:
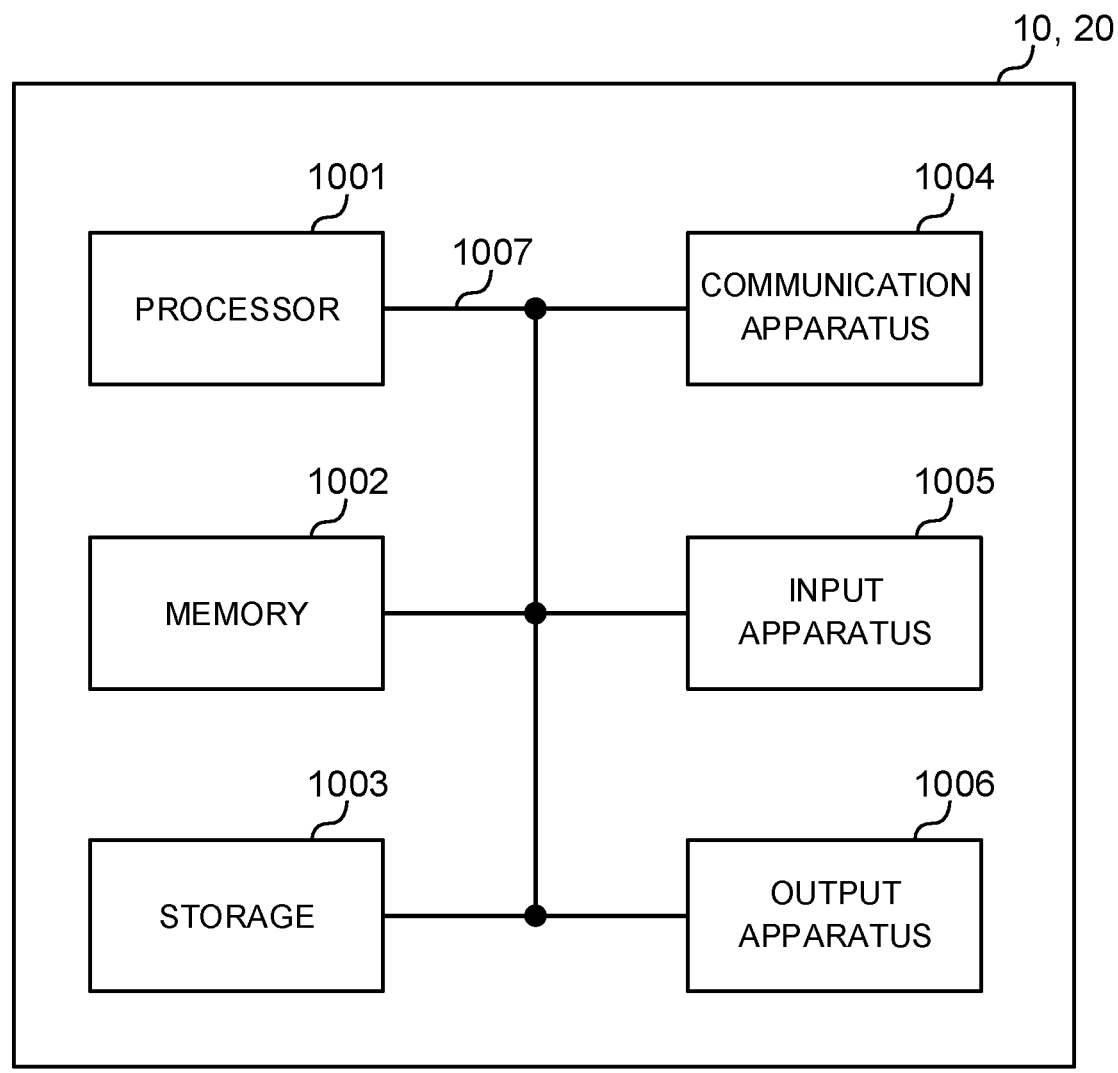
FIG. 15 is a diagram illustrating one example of hardware configurations of the radio base station and the user terminal according to the present embodiment.

For example, the radio base station and the user terminal according to the one embodiment of the present invention may function as computers that perform processing of the radio communication method according to the present invention. FIG. 15 is a diagram illustrating one example of the hardware configurations of the radio base station and the user terminal according to the one embodiment of the present invention. The above radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 15 or may be configured without including part of the apparatuses.

For example, FIG. 15 illustrates the only one processor 1001. However, there may be a plurality of processors. Furthermore, processing may be executed by one processor or may be executed by one or more processors concurrently, successively or by another method. In addition, the processor 1001 may be implemented by one or more chips.

Each function of the radio base station 10 and the user terminal 20 is realized by, for example, causing hardware such as the processor 1001 and the memory 1002 to read predetermined software (program), and thereby causing the processor 1001 to perform an operation, and control communication of the communication apparatus 1004 and reading and/or writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above embodiments are used. For example, the control section 401 of the user terminal 20 may be realized by a control program stored in the memory 1002 and operating on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to carry out the radio communication method according to the one embodiment of the present invention.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via a wired and/or radio network, and is also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above transmission/reception antennas 101 (201), amplifying sections 102 (202), transmitting/receiving sections 103 (203) and communication path interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed of a single bus or may be composed of buses that are different between apparatuses.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may realize part or all of each function block. For example, the processor 1001 may be implemented by at least one of these types of hardware.

Modified Example

In addition, each term that has been described in this description and/or each term that is necessary to understand this description may be replaced with terms having identical or similar meanings. For example, a channel and/or a symbol may be signals (signaling). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of durations (frames) in a time-domain. Each of one or a plurality of durations (frames) that composes a radio frame may be referred to as a subframe. Furthermore, the subframe may include one or a plurality of slots in the time-domain. The subframe may be a fixed time duration (e.g., 1 ms) that does not depend on the numerologies.

Furthermore, the slot may include one or a plurality of symbols (Orthogonal Frequency Division Multiplexing (OFDM) symbols or Single Carrier Frequency Division Multiple Access (SC-FDMA) symbols) in the time-domain. Furthermore, the slot may be a time unit based on the numerologies. Furthermore, the slot may include a plurality of mini slots. Each mini slot may include one or a plurality of symbols in the time-domain. Furthermore, the mini slot may be referred to as a subslot.

The radio frame, the subframe, the slot, the mini slot and the symbol each indicate a time unit for conveying signals. The other corresponding names may be used for the radio frame, the subframe, the slot, the mini slot and the symbol. For example, 1 subframe may be referred to as a Transmission Time Interval (TTI), a plurality of contiguous subframes may be referred to as TTIs, or 1 slot or 1 mini slot may be referred to as a TTI. That is, the subframe and/or the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as a slot or a mini slot instead of a subframe.

In this regard, the TTI refers to, for example, a minimum time unit of scheduling for radio communication. For example, in the LTE system, the radio base station performs scheduling for allocating radio resources (a frequency bandwidth or transmission power that can be used by each user terminal) in TTI units to each user terminal. In this regard, a definition of the TTI is not limited to this.

The TTI may be a transmission time unit of a channel-coded data packet (transport block), code block and/or codeword, or may be a processing unit of scheduling or link adaptation. In addition, when the TTI is given, a time interval (e.g., the number of symbols) in which a transport block, a code block and/or a codeword are actually mapped may be shorter than the TTI.

In addition, when 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that compose a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe, a short subframe, a mini slot or a subslot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

Resource Blocks (RBs) are resource allocation units of the time-domain and the frequency-domain, and may include one or a plurality of contiguous subcarriers in the frequency-domain. Furthermore, the RB may include one or a plurality of symbols in the time-domain or may have the length of 1 slot, 1 mini slot, 1 subframe or 1 TTI. 1 TTI or 1 subframe may be each composed of one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may be composed of one or a plurality of Resource Elements (REs). For example, 1 RE may be a radio resource domain of 1 subcarrier and 1 symbol.

In this regard, structures of the above radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and parameters described in this description may be expressed by absolute values, may be expressed by relative values with respect to predetermined values or may be expressed by other corresponding information. For example, a radio resource may be instructed by a predetermined index. Furthermore, numerical expressions that use these parameters may be different from those explicitly disclosed in this description.

Names used for parameters in this description are in no respect restrictive ones. For example, various channels (the Physical Uplink Control Channel (PUCCH) and the Physical Downlink Control Channel (PDCCH)) and information elements can be identified based on various suitable names. Therefore, various names assigned to these various channels and information elements are in no respect restrictive ones.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by a management table. The input and output information and signals can be overwritten, updated or additionally written. The output information and signals may be deleted. The input information and signals may be transmitted to other apparatuses.

Notification of information is not limited to the aspects/embodiments described in this description and may be performed by other methods. For example, the information may be notified by physical layer signaling (e.g., Downlink Control Information (DCI) and Uplink Control Information (UCI)), higher layer signaling (e.g., Radio Resource Control (RRC) signaling, broadcast information (Master Information Blocks (MIBs) and System Information Blocks (SIBs)), and Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by, for example, an MAC Control Element (MAC CE).

Furthermore, notification of predetermined information (e.g., notification of "being X") may be made not only explicitly but also implicitly (by, for example, not notifying this predetermined information or by notifying another information).

Decision may be made based on a value (0 or 1) expressed by 1 bit, may be made based on a boolean expressed by true or false or may be made by comparing numerical values (e.g., comparison with a predetermined value).

Irrespectively of whether software is referred to as software, firmware, middleware, a microcode or a hardware description language or as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Subscriber Lines (DSL)) and/or radio techniques (e.g., infrared rays and microwaves), these wired techniques and/or radio technique are included in a definition of the transmission media.

The terms "system" and "network" used in this description are compatibly used.

In this description, the terms "Base Station (BS)", "radio base station", "eNB", "gNB", "cell", "sector", "cell group", "carrier" and "component carrier" can be compatibly used. The base station is also referred to as a term such as a fixed station, a NodeB, an eNodeB (eNB), an access point, a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can provide communication service via a base station subsystem (e.g., indoor small base station (RRH: Remote Radio Head)). The term "cell" or "sector" indicates part or the entirety of the coverage area of the base station and/or the base station subsystem that provide communication service in this coverage.

In this description, the terms "Mobile Station (MS)", "user terminal", "User Equipment (UE)" and "terminal" can be compatibly used. The base station is also referred to as a term such as a fixed station, a NodeB, an eNodeB (eNB), an access point, a transmission point, a reception point, a femtocell or a small cell in some cases.

The mobile station is also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

Furthermore, the radio base station in this description may be read as the user terminal. For example, each aspect/embodiment of the present invention may be applied to a configuration where communication between the radio base station and the user terminal is replaced with communication between a plurality of user terminals (D2D: Device-to-Device). In this case, the user terminal 20 may be configured to include the functions of the above radio base station 10. Furthermore, words such as "uplink" and "downlink" may be read as "sides". For example, the uplink channel may be read as a side channel.

Similarly, the user terminal in this description may be read as the radio base station. In this case, the radio base station 10 may be configured to include the functions of the above user terminal 20.

In this description, specific operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MME) or Serving-Gateways (S-GW) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" calculating, computing, processing, deriving, investigating, looking up (e.g., looking up in a table, a database or another data structure) and ascertaining. Furthermore, "deciding (determining)" may be regarded to "decide (determine)" receiving (e.g., receiving information), transmitting (e.g., transmitting information), input, output and accessing (e.g., accessing data in a memory). Furthermore, "deciding (determining)" may be regarded to "decide (determine)" resolving, selecting, choosing, establishing and comparing. That is, "deciding (determining)" may be regarded to "decide (determine)" some operation.

The words "connected" and "coupled" used in this description or every modification of these words can mean every direct or indirect connection or coupling between two or more elements, and can include that one or more intermediate elements exist between the two elements "connected" or "coupled" with each other. The elements may be coupled or connected physically, logically or by way of a combination of physical and logical connections. For example, "connection" may be read as "access". It can be understood that, when used in this description, the two elements are "connected" or "coupled" with each other by using one or more electric wires, cables and/or printed electrical connection, and by using electromagnetic energy having wavelengths in radio frequency domains, microwave domains and/or (both of visible and invisible) light domains in some non-restrictive and incomprehensive examples.

When the words "including" and "comprising" and modifications of these words are used in this description or the claims, these words intend to be comprehensive similar to the word "having". Furthermore, the word "or" used in this description or the claims intends not to be an exclusive OR.

The present invention has been described in detail above. However, it is obvious for a person skilled in the art that the present invention is not limited to the embodiments described in this description. The present invention can be carried out as modified and changed aspects without departing from the gist and the scope of the present invention defined by the recitation of the claims. Accordingly, the disclosure of this description intends for exemplary explanation, and does not have any restrictive meaning to the present invention.

The invention claimed is:

1. A terminal comprising:
   a receiver that receives downlink control information (DCI);
   a processor that determines a parameter set corresponding to bit information included in the DCI among a plurality of parameter sets received via radio resource control (RRC) signaling, each of the plurality of parameter sets related to one or more uplink control channel (PUCCH) resources; and
a transmitter that transmits uplink control information (UCI) using the determined parameter set,
wherein each of the plurality of parameter sets includes information indicating PUCCH format, physical resource block (PRB) index and symbol index.

2. A radio communication method for a terminal comprising:
receiving downlink control information (DCI);
determining a parameter set corresponding to bit information included in the DCI among a plurality of parameter sets received via radio resource control (RRC) signaling, each of the plurality of parameter sets related to one or more uplink control channel (PUCCH) resources; and
transmitting uplink control information (UCI) using the determined parameter set,
wherein each of the plurality of parameter sets includes information indicating PUCCH format, physical resource block (PRB) index and symbol index.

3. A system comprising a terminal and a base station, wherein:
the terminal comprises:
a receiving section that receives downlink control information (DCI);
a processor that determines a parameter set corresponding to bit information included in the DCI among a plurality of parameter sets received via radio resource (RRC) signaling, each of the plurality of parameter sets related to one or more uplink control channel (PUCCH) resources; and
a transmitter that transmits uplink control information (UCI) using the determined parameter set, and
the base station comprises:
a transmitter that transmits the plurality of parameter sets to the terminal via the RRC signaling,
wherein each of the plurality of parameter sets includes information indicating PUCCH format, physical resource block (PRB) index and symbol index.

4. A base station comprising:
a transmitter that transmits a plurality of parameter sets, each of the plurality of parameter sets related to one or more uplink control channel (PUCCH) resources;
a processor that controls to transmit bit information corresponding to a parameter set among the plurality of parameter sets transmitted via radio resource control (RRC) signaling, included in downlink control information (DCI); and
a receiver that receives uplink control information (UCI) transmitted by a terminal using the parameter set corresponding to the bit information,
wherein each of the plurality of parameter sets includes information indicating PUCCH format, physical resource block (PRB) index and symbol index.

* * * * *